US012726339B2

(12) United States Patent
Mensch et al.

(10) Patent No.: US 12,726,339 B2
(45) Date of Patent: Sep. 1, 2026

(54) SECURE KEY EXCHANGE

(71) Applicant: Apple Inc., Cupertino, CA (US)

(72) Inventors: Thomas P. Mensch, Sunnyvale, CA (US); Elad Efrat, San Jose, CA (US); David Tamagno, Livermore, CA (US); Armaiti Ardeshiricham, San Diego, CA (US); Wade Benson, Sunnyvale, CA (US); Yannick L Sierra, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/542,176

(22) Filed: Dec. 15, 2023

(65) Prior Publication Data

US 2025/0097018 A1 Mar. 20, 2025

Related U.S. Application Data

(60) Provisional application No. 63/583,711, filed on Sep. 19, 2023, provisional application No. 63/583,716, filed on Sep. 19, 2023.

(51) Int. Cl.
*H04L 9/08* (2006.01)
*G06F 21/60* (2013.01)
*G06F 21/72* (2013.01)

(52) U.S. Cl.
CPC ............ *H04L 9/083* (2013.01); *G06F 21/602* (2013.01); *G06F 21/606* (2013.01); *G06F 21/72* (2013.01); *H04L 9/0825* (2013.01)

(58) Field of Classification Search
CPC ..... H04L 9/083; H04L 9/0825; G06F 21/602; G06F 21/606; G06F 21/72
See application file for complete search history.

(56) References Cited

U.S. PATENT DOCUMENTS 6,941,457 B1 * 9/2005 Gundavelli ........... H04L 9/0841 380/278
9,047,471 B2 6/2015 Polzin et al.
(Continued)

FOREIGN PATENT DOCUMENTS

CN 116248264 A * 6/2023 ........... H04L 9/0861
CN 116432220 A * 7/2023 ......... G06F 21/6218
KR 10-2022-0132557 A 9/2022

OTHER PUBLICATIONS

Apple Inc., iOS Security: IOS 11, Jan. 2018, 82 pages.

*Primary Examiner* — Darshan I Dhruv
(74) *Attorney, Agent, or Firm* — KOWERT, HOOD, MUNYON, RANKIN & GOETZEL, P.C; Paul T. Seegers

(57) ABSTRACT

Techniques are disclosed relating to cryptographic key exchanges. In some embodiments, a first device belonging to a first device group receives a request to perform a key exchange to establish a shared secret with a second device belonging to a second device group. The first device verifies a key authorization data structure issued by a key authority, the key authorization data structure including a first public key of a first participant authority authorized to identify members of the first device group and a second public key of a second participant authority authorized to identify members of the second device group. In response to the verifying being successful, the first device performs the requested exchange using a public key pair attested to by the first participant authority as belonging to a member in the first device group.

20 Claims, 15 Drawing Sheets

(56) References Cited

U.S. PATENT DOCUMENTS 9,251,097 B1 2/2016 Kumar
9,807,067 B1 * 10/2017 Ryan .................... H04L 9/0894
10,320,563 B2 6/2019 Saurav et al.
10,536,271 B1 1/2020 Mensch et al.
10,855,440 B1 * 12/2020 Alwen .................. H04L 9/0894
11,228,421 B1 1/2022 Mesh
12,401,633 B1 * 8/2025 Vanniarajan .......... H04L 63/102
2004/0103280 A1 * 5/2004 Balfanz ................. H04L 63/065
713/169
2007/0168332 A1 7/2007 Bussard
2009/0044260 A1 2/2009 Niglio et al.
2011/0197064 A1 * 8/2011 Garcia Morchon .. H04L 9/3093
713/168
2011/0231921 A1 9/2011 Narayanan et al.
2013/0308838 A1 11/2013 Westerman et al.
2014/0068238 A1 3/2014 Jaber et al.
2014/0181513 A1 * 6/2014 Marek ................... H04L 63/105
713/168
2014/0298432 A1 10/2014 Brown
2015/0222604 A1 * 8/2015 Ylonen ..................... H04L 9/14
713/171
2016/0352516 A1 12/2016 Oberheide et al.
2016/0365975 A1 * 12/2016 Smith ................. H04L 63/0869
2016/0366124 A1 * 12/2016 Benoit ................ H04L 63/0823
2017/0171174 A1 6/2017 Campagna
2017/0201380 A1 7/2017 Schaap
2017/0202046 A1 * 7/2017 Lee ......................... H04W 4/08
2017/0272415 A1 * 9/2017 Zhao ................... H04L 63/0807
2017/0373844 A1 12/2017 Sykora
2018/0048464 A1 * 2/2018 Lim ...................... H04L 63/061
2018/0054426 A1 * 2/2018 Abbott .................... H04L 9/083
2018/0167219 A1 * 6/2018 Campagna ............ H04L 9/3234
2018/0375663 A1 * 12/2018 Le Saint ............... H04L 9/3247
2019/0304507 A1 10/2019 Leyfman
2019/0312726 A1 * 10/2019 Sierra ................... H04L 63/104
2019/0370456 A1 12/2019 Abbasian et al.
2020/0052880 A1 * 2/2020 Bathen .................. H04L 63/102
2020/0052905 A1 2/2020 Mathias
2020/0320199 A1 * 10/2020 Sheth .................... H04L 63/123
2022/0123948 A1 * 4/2022 Wentz ................... H04L 9/3234
2022/0141004 A1 * 5/2022 Murray ................. H04L 9/0861
713/171
2022/0158855 A1 * 5/2022 Wentz ................... H04L 9/3247
2022/0231848 A1 7/2022 Zhang et al.
2022/0272077 A1 8/2022 Gan
2022/0294614 A1 9/2022 Liu
2022/0303137 A1 9/2022 Brogle et al.
2022/0394428 A1 12/2022 Movva et al.
2023/0231709 A1 * 7/2023 Doherty .................. G06F 21/62
713/171
2024/0056302 A1 * 2/2024 Staufer ................... H04L 9/321
2024/0113865 A1 * 4/2024 Noce ..................... H04L 9/0825
2025/0045632 A1 2/2025 Lage Serrano
2025/0047651 A1 * 2/2025 Amer ........................ H04L 9/14

* cited by examiner

SECURE KEY EXCHANGE

The present application claims priority to U.S. Provisional App. Nos. 63/583,711, entitled "Silicon Key Exchange," filed Sep. 19, 2023 and 63/583,716, entitled "Secure Key Exchange," filed Sep. 19, 2023; the disclosures of each of the above-referenced applications are incorporated by reference herein in their entireties.

BACKGROUND

Technical Field

This disclosure relates generally to computer security, and, more specifically, to cryptographic key exchanges to establish a shared secret.

Description of the Related Art

Devices, such as smartphones, laptops, IoT devices, and servers, frequently use network communications over the internet for the transmission of sensitive data. For example, a password manager of a device may share sensitive information such as passwords, encryption keys, personal identification numbers (PINs), etc. Such sensitive data may be used by malicious parties for fraudulent purposes. For example, a malicious actor may eavesdrop on a network communication and obtain a credit card number being transmitted across that network. Malicious software may also attempt to access sensitive information stored on a device by, for example, compromising the operating system. To keep sensitive information private and safe from unauthorized parties, various cryptographic algorithms and protocols have been developed.

DETAILED DESCRIPTION

Figure 1:
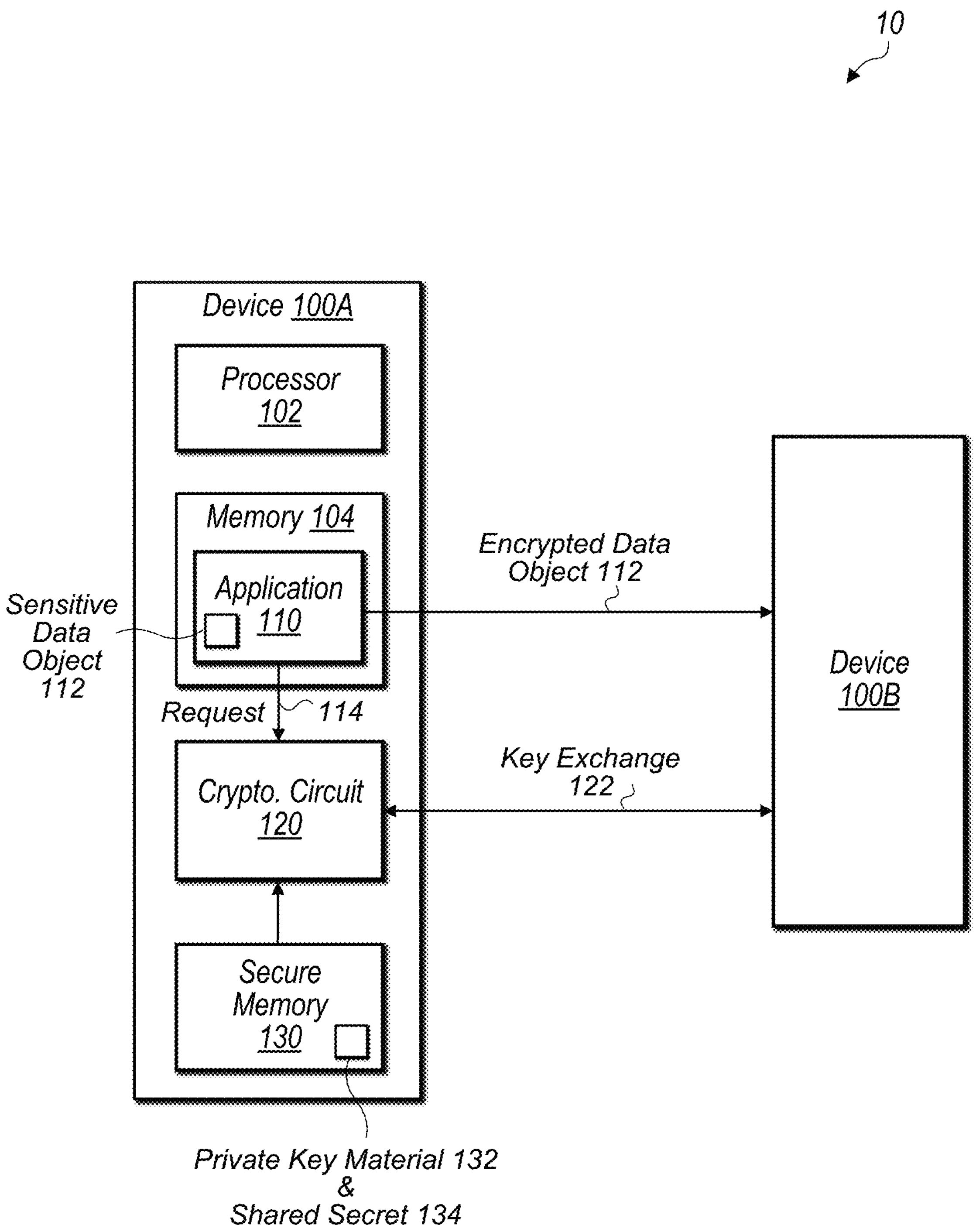
FIG. 1 is a block diagram illustrating an example of a computing system configured to implement a secure key exchange.

The security of cryptographic protocols typically depends on the security of the cryptographic material (e.g., cryptographic keys) used in the protocol. Accordingly, if the cryptographic material used in a particular cryptographic protocol is compromised, then the security of the cryptographic protocol is lost. When cryptographic protocols are implemented in software, the cryptographic material is typically maintained in memory (e.g., RAM) accessible to the processor. In such cases, other (potentially malicious) software may gain, via execution on the processor, unauthorized access to the cryptographic material stored in device memory. Although an operating system may attempt to restrict access to particular portions of memory, an attacker may escalate privileges using a vulnerability and read the memory locations storing private key material, use side-channels attacks to obtain the private key material, etc. Furthermore, software-implemented cryptographic protocols typically have their instructions stored in memory exposing them to a potential unauthorized modification.

The inventors have recognized that it would thus be desirable to maintain private key material of a key exchange in a secure memory that is inaccessible to the processor. As will be discussed in greater detail below in some embodiments, an application executing on the processor of a computing device can request performance of a key exchange to establish a shared secret with another device. In response, a cryptographic circuit of the computing device performs the key exchange of a shared secret derived using private key material maintained in a secure memory that is inaccessible to the processor. In some embodiments, the instructions executed by the cryptographic circuit may also be stored in a memory (e.g., a ROM) that is inaccessible to the processor in order to prevent the instructions from being modified in some unauthorized manner. This use of secure hardware, in some embodiments, can improve communication security by making it more difficult to compromise sensitive key material.

In some cases, a device user may want to distribute sensitive information with more than one device but control the devices authorized to obtain the information. For example, an owner of a device may want to share their passwords with other devices they own while ensuring that a previously owned device does not receive any passwords. As will be discussed below in some embodiments, an authorization hierarchy can be used to restrict what devices are authorized to participate in key exchanges for obtaining the sensitive data. Instead of having a single entity for authorizing all devices, this hierarchy may include a key authority that authorizes two or more device groups to exchange keys but delegates identifying group membership to participant authorities. When a device in a group later wants to participate in a key exchange with a device in another group, the device can determine whether such an action is permissible by verifying attestations issued by the authorities in the hierarchy.

Turning now to FIG. 1, a block diagram of a key exchange system 10 is depicted. In the illustrated embodiment, system 10 includes a computing device 100A, which includes a processor 102, memory 104, a cryptographic circuit 120, and secure memory 130 coupled to cryptographic circuit 120. Memory 104 includes application 110 while secure memory 130 includes private key material 132 and shared secret 134. System 10 further includes a device 100B. In some embodiments, system 10 may be implemented differently than shown—e.g., computing devices 100A and 100B may include one or more components discussed below with respect to FIGS. 5-6.

Application 110, in various embodiments, is a set of program instructions stored in memory 104 executable by processor 102 to store and share sensitive information with device 100B such as sensitive data object 112 shown in FIG. 1. For example, application 110 may be a password manager storing passwords, an operating system managing files, a digital car key application maintaining a digital car key, etc. In some cases, application 110 may establish a shared secret with another device to securely exchange one of these sensitive data objects 112. For example, a parent may want to share a digital car key with their child using the car manufacturer's key management application.

In the illustrated embodiment, however, application 110 is stored in memory 104 accessible to processor 102 and thus may be more vulnerable to having its data accessed in an unauthorized manner. If application 110 (or some other assisting application) were to perform a key exchange with device 100B to establish a shared secret and used memory 104 to store the key material for the exchange and the shared secret in memory 104, a malicious actor who compromised device 100A may be able to read the shared secret and/or the material—and thus decrypt an encrypted version of sensitive data object 112. A malicious actor might also attempt to modify the program instructions implementing the key exchange in order to compromise the integrity of key exchange 122.

As will be discussed, instead of using memory 104 to store key data for performing the key exchange, hardware circuitry (e.g., cryptographic circuit 120, secure memory 130) that is inaccessible to processor 102, in some embodiments, is used to protect key data shown as private key material 132 and shared secret 134 in FIG. 1. In the illustrated embodiment, application 110 can send a request 114 to cryptographic circuit 120 for performance of a key exchange 122 with device 100B to establish a shared secret 134 between both devices. Then, cryptographic circuit 120, which is coupled to secure memory 130 inaccessible to processor 102, is configured to perform key exchange 122, including deriving shared secret 134 using private key material 132 maintained in secure memory 130.

Figure 5:
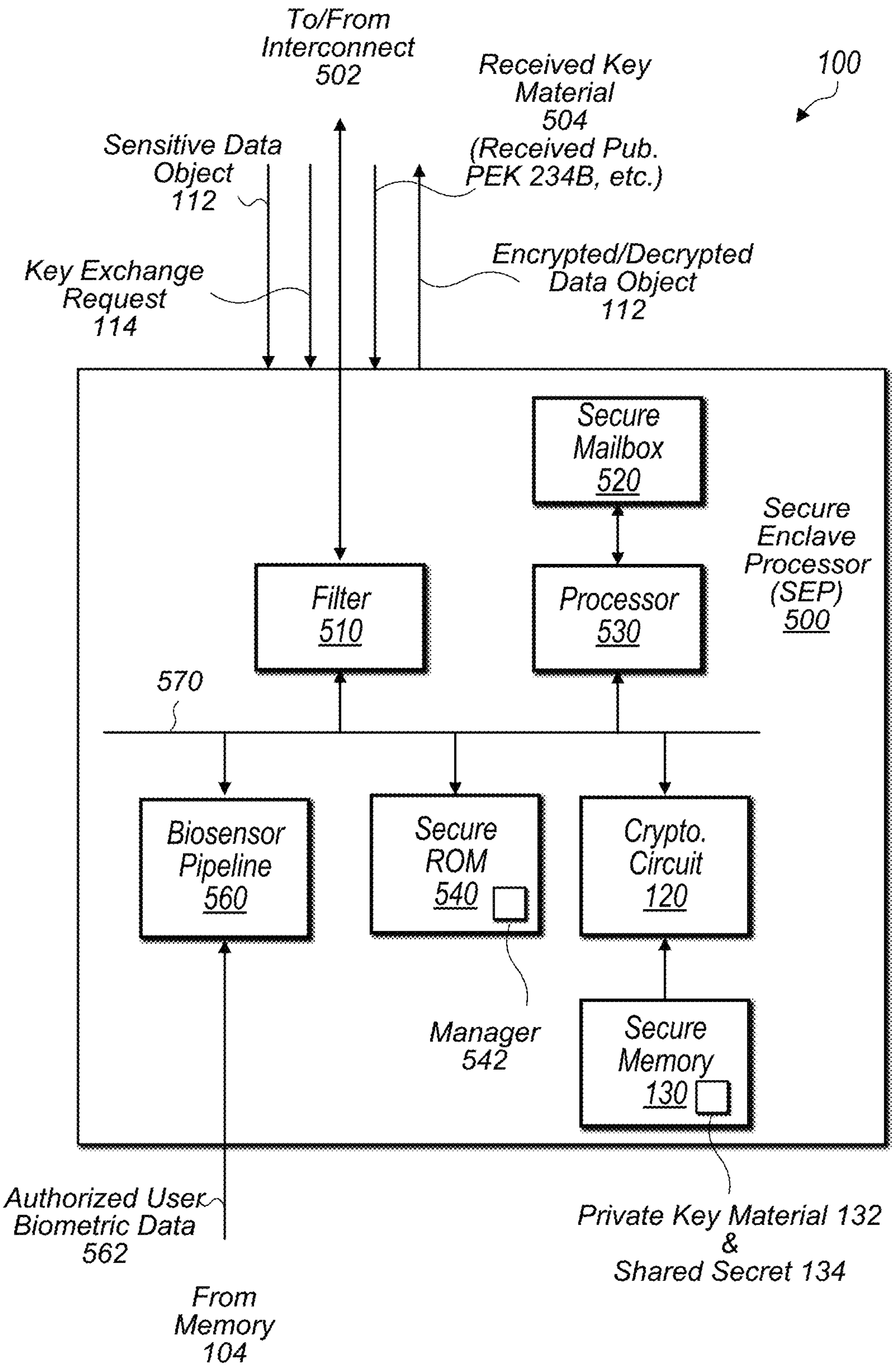
FIG. 5 is a block diagram illustrating an example of a secure enclave processor including cryptographic circuitry configured to perform the secure key exchange.

Cryptographic circuit 120 is a secure circuit configured to perform cryptographic operations (e.g., as part of a secure enclave processor (SEP) as shown in FIG. 5), including key generation as well as encryption and decryption using keys, which may be stored in secure memory 130 (or stored externally in a protected manner). As used herein, the term "secure circuit" refers to a circuit that protects an isolated, internal resource from being directly accessed by an external circuit such as processor 102. This internal resource may be memory that stores sensitive data such as personal information (e.g., biometric information, credit card information, etc.), encryptions keys, random number generator seeds, etc. This internal resource may also be circuitry that performs services/operations associated with sensitive data such as encryption, decryption, generation and verification of digital signatures, etc. Cryptographic circuit 120 may implement any suitable encryption algorithm such as Data Encryption Standard (DES), Advanced Encryption Standard (AES), Rivest Shamir Adleman (RSA), Digital Signature Algorithm (DSA), etc. In some embodiments, circuit 120 may further implement elliptic curve cryptography (ECC).

Secure memory 130, in various embodiments, is a circuit configured to store data in a way that is inaccessible to processor 102. Secure memory 130 may be a local memory (e.g., internal memory) configured to store key data, which may include private key material 132, shared secret 134, encrypted data object 112, etc. In some embodiments, secure memory 130 may be configured such that only cryptographic circuit 120 is able to read and write data to secure memory 130. Accordingly, while an application running on processor 102 may be able to request performance of an action (e.g., key exchange 122) with respect to data in secure memory 130, processor 102 may not be able to read or write data to secure memory 130. Thus, if processor 102 were to execute compromised program instructions, processor 102 would be unable to read and write private key material 132 and shared secret 134 as memory 130 may, for example, lack the physical read and write interfaces to facilitate such actions for processor 102. In some embodiments, cryptographic circuit 120 may access other forms of storage, which may include other non-volatile storages such as discussed below with respect to FIG. 6. In some embodiments, these other storages may also include a set of fuses that are burnt during a fabrication in order to record a portion of key material 132 such as a unique identifier (UID), which may be used derive keys in private key material 132 or other key data. In some embodiments, to expand its available storage, keys generated by cryptographic circuit 120 may be stored externally to memory 130 but encrypted using one or more keys stored only in secure memory 130. Exemplary components of secure memory 130 will be discussed in more detail with respect to FIG. 6.

In various embodiments, cryptographic circuit 120 is configured to receive a request 114 from application 110 to perform key exchange 122 to establish a shared secret 134 between devices 100A and 100B. In some embodiments, key exchange 122 includes an Elliptic-curve Diffie-Hellman (ECDH) exchange in which circuit 120 creates shared secret 134 and stores it in secure memory 130. As part of this exchange, devices 100 may initially generate respective public key pairs (referred to below as participant exchange keys) including a private key and a corresponding public key. Then, each device 100 may share its own public key with the other device 100. Afterwards, each device 100 may perform a Diffie-Hellman using its private key and the other device's public key to derive shared secret 134. In the illustrated embodiment, the private key material 132 of device 100 includes the data used to establish shared secret 134 such a device 100's private key, the received public key, and/or additional key material used to drive or attest to these keys. For example, as will be discussed below with FIG. 3, private key material 132 may also include identity keys used to attest to the DH keys, which may further be ephemeral keys. After key exchange 122, circuit 120 may further encrypt sensitive data object 112 using shared secret 134 stored in secure memory 130. Then, application 110 can send encrypted data object 112 (without accessing the shared secret 134). Afterwards, device 100B may use its derived shared secret 134 to decrypt secure encrypted data object 112. In some embodiments, device 100B implements its side of key exchange 122 using another instance of cryptographic circuit 120 and secure memory 130; in other embodiments, device 100B may implement exchange 122 differently than device 100A.

In some embodiments, users may want to share sensitive data object 112 with different devices but control the devices that are authorized to participate in a key exchange 122—and thus authorized to receive object 112. For example, a user may want to share sensitive data between his or her devices, which may be different from each other (e.g., devices that use different types of platforms, processors services, manufacturers). For example, a user of a credential manager may want to share a password from one or more of devices associated with Apple® account to an Android® device associated with Google® account, despite each device's association with a different platform. As will be discussed below in some embodiments, an authorization hierarchy may be used to authorize and authenticate participating devices 100 in which, for example, Google® may establish and verify the ownership of the Android® devices while Apple® may establish and verify the ownership of the Apple® devices. Thus, a group of devices authorized to participate in a key exchange 122 may be verifiable to prevent an unauthorized device from obtaining a sensitive data object 112.

Figure 2:
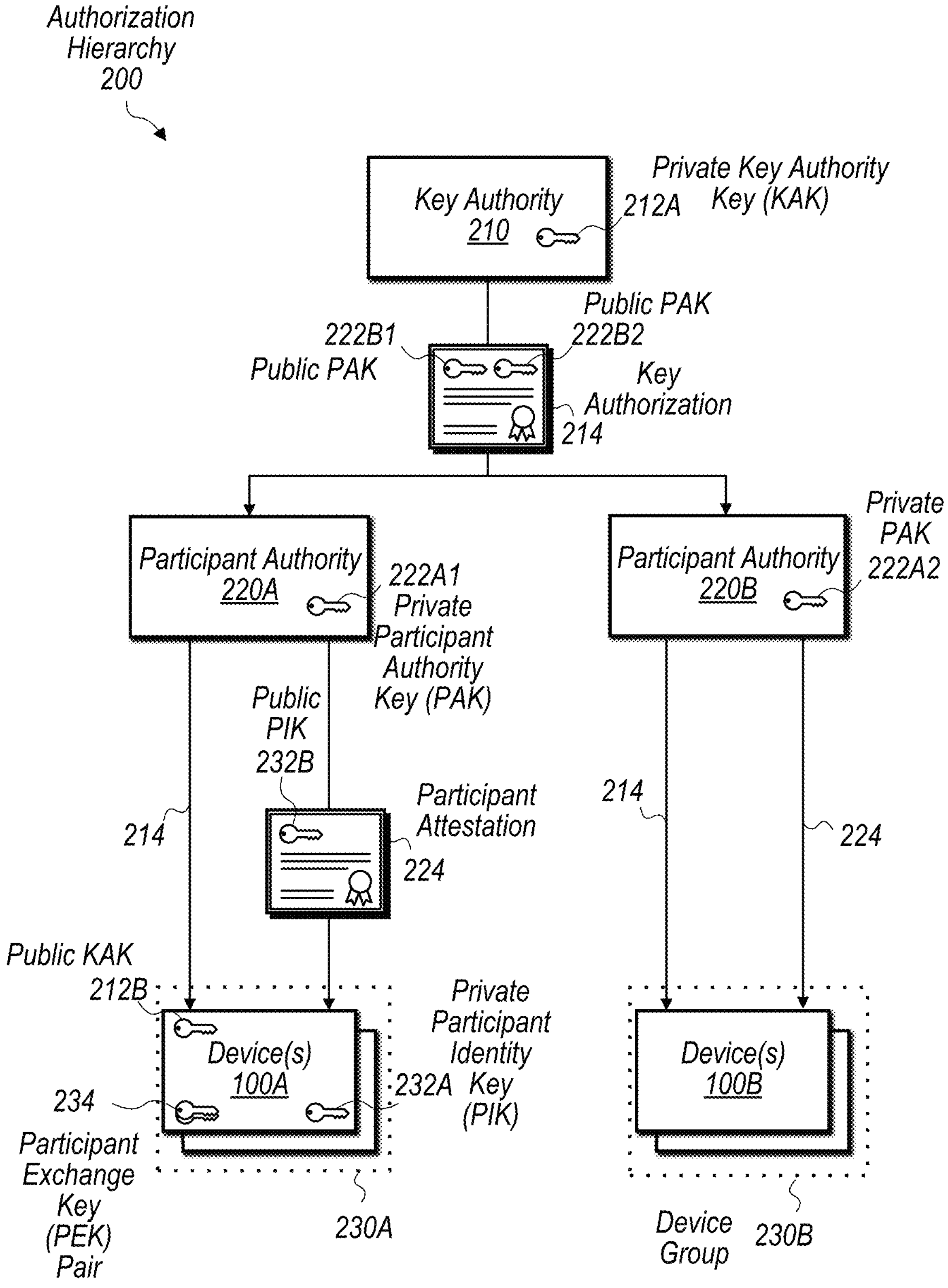
FIG. 2 is a block diagram illustrating an example of an authorization hierarchy to authorize the secure key exchange.

Turning now to FIG. 2, a block diagram illustrating an example of an authorization hierarchy 200 to authorize a key exchange is depicted. In the illustrated embodiment, authorization hierarchy 200 includes a key authority 210, participant authorities 220A and B, and devices 100A and B respectively belonging to device groups 230A and B. In some embodiments, authorization hierarchy 200 may be implemented differently—e.g., hierarchy 200 may include additional device groups, participant authorities, key authorities, etc.

A device group 230, in various embodiments, is a set of devices 100 that may share one or more common properties with one another. For example, devices 100 in a given group 230 may be devices that belong to a single user, members of a family, employees working the same office, devices sharing the same operating system, application, underlying hardware, manufacturer, servers belonging to the same server cluster, etc. As noted above, a user may desire the transfer of sensitive data between devices of different groups without unauthorized devices participating in the exchange. For example, members of a family with a variety of devices may desire sharing a sensitive data object 112 such as a digital car key, website password, etc. In order to ensure an unauthorized device does not participate in a key exchange to obtain the sensitive data object 112, authorization hierarchy 200 provides a way to verify that devices 100 authorized to participate in key exchanges 122.

Key authority (KA) 210, in various embodiments, is a trusted computing system configured to authorize particular participant groups 230 by identifying participant authorities (PAs) 220, which, in turn, identify members of groups 230. In the illustrated embodiment, KA 210 grants authority to PAs 220 by generating a key authorization 214. In some embodiments, KA 210 may initially receive a request to authorize key exchanges between devices of group 230A and devices of group 230B along with public keys 222B1 and 222B2 of respective PAs 220A and 220B responsible for identifying group membership. For example, KA 210 may provide a web interface that allows a trusted person to provide these public participant authority keys (PAKs) 222B—or delegate computing systems to act as PAs 220, which separately provide their PAKs 222B. As shown, KA 210 may use a private key authority key (KAK) 212A to sign a key authorization 214 that includes public PAK 222B1 of a PA 220A and public PAK 222B2 of PA 220B. The corresponding public key 212B of private KAK 212A may then be distributed to PAs 220 and devices 100 to verify the signature of key authorization 214. In signing multiple PAKs 222B together with the same key authorization 214, KA 210 grants authority to PAs 220 to determine group membership but also binds their respective groups 230A and 230B together such that PAs 220 are not able to grant authority to some other group to participate key exchanges 122 with groups 230A and 230B. In some embodiments, key authorization 214 may include more than two public PAKs 222B to enable more than two groups to participate in key exchanges 122. For example, an IT administrator of a company with three offices may want to enable three site administrators to identify servers permitted to communicate with one another and have KA 210 issue a single key authorization 214 for PAs 220 located at each site. In another embodiment, however, multiple key authorizations 214 may be issued to enable key exchanges 122 between the three sites. Note that in other embodiments, KA 210 directly authorizes individual devices (e.g., devices 110A and 110B) instead of doing so using participant authorities. In that case, the authorized individual device would be its own participant authority, while other devices are still able to verify via KA 210 whether the device is authorized to perform key exchange 122.

In some embodiments, key authorizations 214 may include additional information describing the exchange between participant authorities 220. This information may limit the operations that each device 100 may perform with respect to the data object 112 being transmitted, thus implementing usage policies for the devices. For example, a key authorization 214 may include flags that specify that devices 100 enrolled by participant authority 220A are permitted to only send particular data objects 112 but not receive data objects 112 from devices 100 enrolled by participant authority 220B while devices 100B enrolled by participant authority 220B may only receive data objects 112 from devices 100A enrolled by authority 220A. The integrity of these flags can be preserved through the signing of a key authorization 214. Cryptographic circuit 120 can thus protect the specified usage policy from tampering by verifying key authorization 214 (e.g., using public KAK 212B) and stop performing key exchange 122 if verification fails.

PAs 220, in various embodiments, are trusted computing systems configured to establish and maintain group membership for particular groups 230. In the illustrated embodiment, a PA 220 identifies a device 100's membership in a particular group by generating a participant attestation 224. To generate an attestation 224, a device 100 may initially generate (e.g., using cryptographic circuit 120) a participant identity key (PIK) pair 232 to be associated with an identity of the device 100. Device 100 may then send an enrollment request for a participant authority 220 to issue an attestation 224 identifying device 100 as a member of a device group 230. In some embodiments, this request includes account information for a user account associated with each device of a group 230 and usable by the PA 220 to determine that device 100 should be a member of device group 230. In some embodiments, the PIK pair 232 is derived using previously stored key material 132 (e.g., a unique identifier (UID) as discussed with FIG. 6) trusted by PA 220 and usable by PA 220 to authenticate device 100. Continuing with the password sharing example mentioned above, a KA 210 may be a server associated with a cross-platform password manager used by a user having devices with two separate platforms such as Android® and Apple®. KA 210 may then issue a key authorization 214 for the user's account granting PAs 220A and 220B associated with these platforms the authority to identify a group 230A of devices 100A associated with the user's iCloud® account and a group 230B of device 100B associated with the user's Google® account. After determining that a device 100 should be a member a group 230, PA 220 may then provide a participant attestation 224 including the device 100's public PIK 232B and signed by private PAK 222A. This attestation 224 can then be verified by verifying its signature using the corresponding public PAK 222B included in key authorization 214. PA 220 may repeat this process for all devices enrolled in a given group 230.

As will be discussed next with FIGS. 3A-B, two devices 100A and 100B in different groups 230A and 230B may then participate in a key exchange 122 in which they can use a previously obtained key authorization 214 and their respective participant attestations 224 to confirm that the members of groups 230 are authorized to participate in a key exchange 122. This exchange 122 may also include exchanging participant exchange keys (PEKs) 234 attested to by their private PIKs 232A.

Figure 3A:
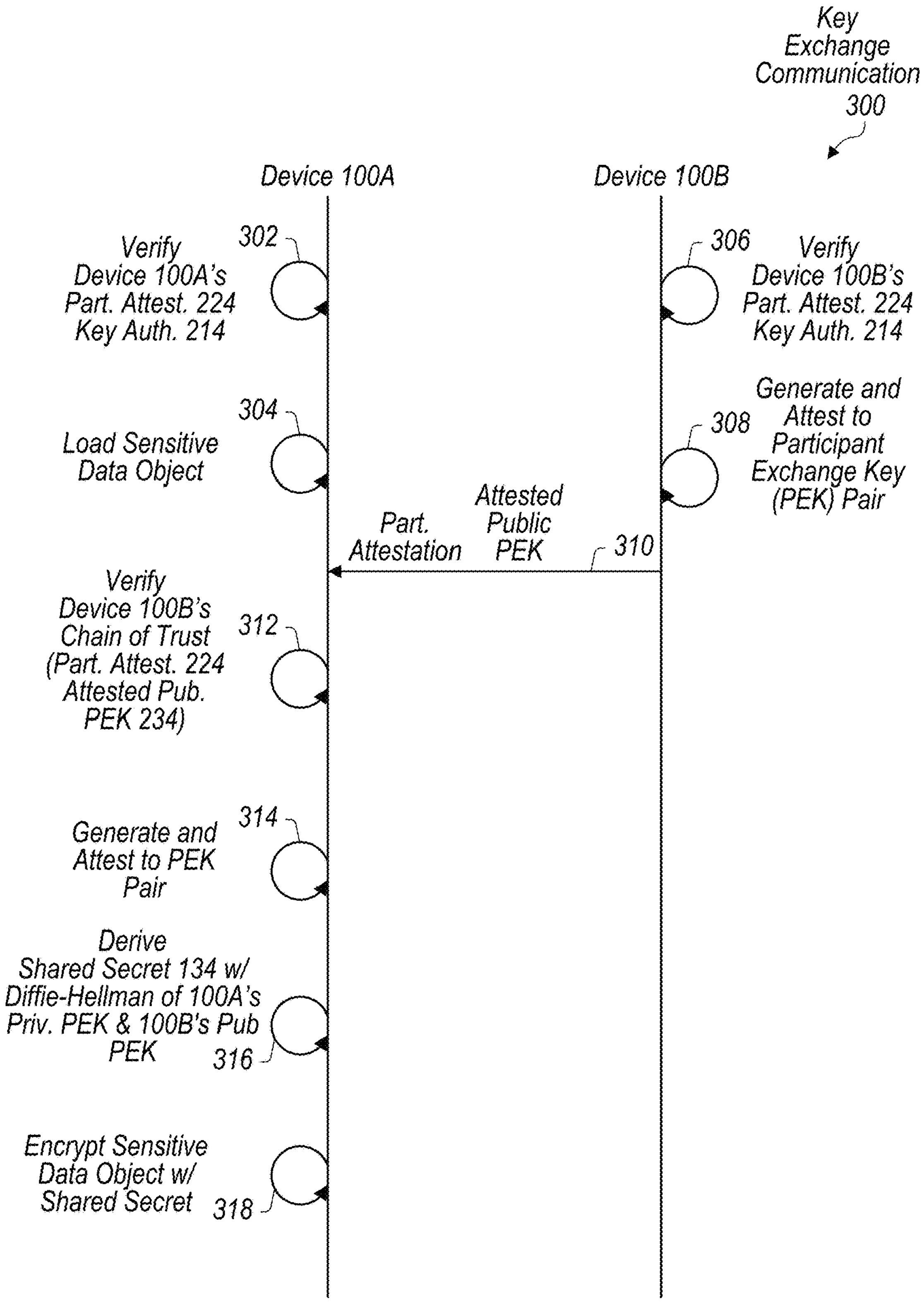
FIGS. 3A and 3B are a communication diagram illustrating an example of communicated messages and actions performed during the key exchange.

Turning now to FIG. 3A, a communication diagram of a key exchange communication 300 for implementing key exchange 122 is depicted. In the illustrated embodiment, key exchange 300 includes steps of both key exchange 122 and the sending of data object 112. In some embodiments, key exchange 300 may be implemented differently than shown—e.g., steps may be performed in a different order, concurrently, or omitted; key exchange 300 may include more steps than shown; etc. In various embodiments, secure circuit 120 implements various ones of the steps discussed with respect to communication 300.

As shown, key exchange 300 begins in step 302, in which device 100A verifies key authorization 214 and participant attestation 224 from participant authority 220A in order to confirm that it has been authorized to participate in an exchange 122. Accordingly, device 100A may initially verify key authorization 214 (and thus public PAKs 222B1 and 222B2) using a stored copy of public KAK 212B to validate the signature in authorization 214. Device 100A may then verify its participant attestation 224 using a stored copy of public PAK 222B1 to confirm its membership in group 230A associated with PA 220A. At 304, a secure circuit 120 in device 100A loads a sensitive data object 112 from application 110 to share it with device 100B.

Key exchange 300 continues in step 306 (which may be performed in parallel with steps 302-304) in which device 100B verifies key authorization 214 and participant attestation 224 from participant authority 220B. Similar to step 302, device 100B may verify its participant attestation 224 and key authorization 214 to confirm that device 100B is enrolled in group 230B and authorized to perform key exchange 122.

At step 308, device 100B generates and attests to an ephemeral participant exchange key (PEK) pair 234. In various embodiments, device 100B attests to the pair 234 by signing the public key of the pair 234 with its private PIK 232A, which is attested to by its participant attestation 224. At step 310, device 100B sends, to device 100A, its attested public PEK 234B and its participant attestation 224 that includes its public PIK 232B.

At step 312, device 100A verifies key authorization 214 and the participant attestation 224 of device 100B. Accordingly, device 100A may verify device 100B's participant attestation 224 (and thus device 100B's public PIK 232B) using PA 220B's public PAK 222B2 included key authorization 214 (already verified in step 302) to confirm device 100B's membership in group 230B. Then, device 100A may further verify signature of device 100B's attested public PEK 234B using device 100B's public PIK 232B included in its participant attestation 224.

At step 314 in response to the verification being successful, device 100A generates its own PEK pair 234 and attests to it by signing the public PEK 234B using its private PIK 232A attested to by its participant attestation 224. At step 316, device 100A then derives shared secret 134 by performing Elliptic-curve Diffie-Hellman (ECDH) using its private PEK 234A and device 100B's public PEK 234B (verified in step 312). Then, at step 318, device 100A may encrypt sensitive data object 112 using shared secret 134.

Figure 3B:
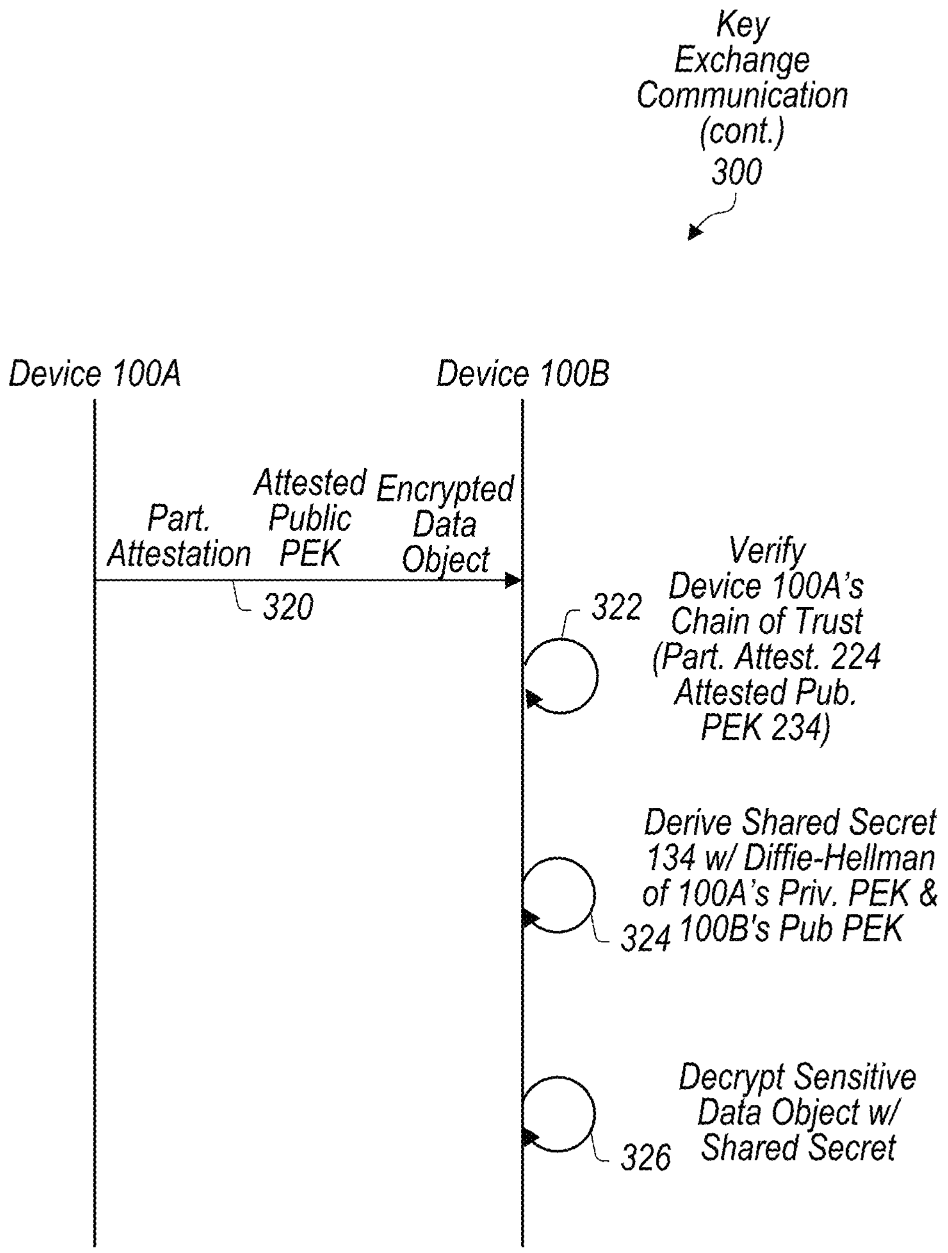

Key exchange communication 300 continues with FIG. 3B depicting a remaining portion of communication 300 in which, at step 320, device 100A sends its participant attestation 224 including public PIK 232B, its public PEK 234B (attested to with private PIK 232A), and encrypted data object 112.

At step 322, device 100B verifies key authorization 214 and device 100A's participant attestation 224 including verifying device 100A's participant attestation 224 and signed public PEK 234B similar to step 312. In response to this verification being successful, device 100B, at step 324, performs EDCH to derive the same shared secret 134 using device 100B's private PEK 234A and device 100A's public PEK 234B. Finally, at step 326, device 100B decrypts encrypted data object 112 using the derived shared secret 134.

As has been discussed, key exchange 300 relies on multiple attestations 214 and 224. If any break in the attestation chain (e.g., a signature verification fails with respect to one of attestations 214 or 224), devices 100 may suspend performance of key exchange 300 (and thus the exchange of sensitive data object 112). As will be discussed with FIGS. 4A-C, there may be instances where it is desirable to revoke a given device 100, PA 220, or KA 210's ability to participate in authorization hierarchy 200. Various revocation processes will now be discussed.

Figure 4A:
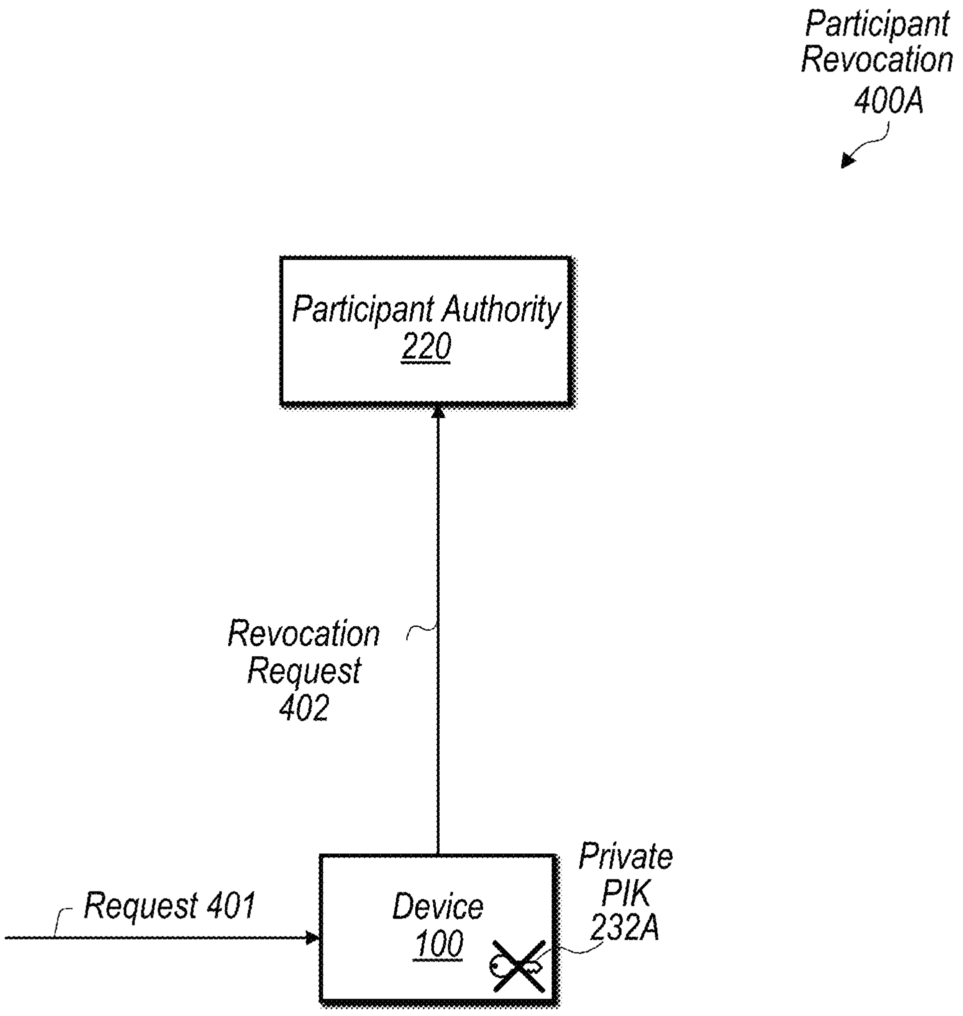
FIGS. 4A-4C are block diagrams illustrating examples of revocations associated with components of the authorization hierarchy.

Turning now to FIG. 4A, a block diagram of participant revocation 400A is depicted. In some cases, the owner of a device 100 may have control of a device 100 but wants to discontinue using it as if the owner is selling or giving the device 100 to another person. While the owner is still in possession of device 100, the owner may initiate participant revocation 400A to prevent the next user of device 100 from using it to obtain a data object 112 belonging to the original owner.

As shown, participant revocation 400 may begin with device 100 receiving a request 401 to revoke its membership in a group 230. In some embodiments, request 401 is received by a user interacting with a graphical user interface of device 100A; in other embodiments, request 401 is generated remotely by a user or administrator interacting with a server, which then sends request 401 to device 100A. In response to receive request 401, device 100 then deletes its private PIK pair 232 preventing it from being able to attest to any PEK pair 234, which may be generated in any subsequent key exchange 122. Device 100 may also send a revocation request 402 notifying PA 220 of the revocation so that PA 220 does not issue any new participant attestation 224 for any subsequently generated PIK pair 232.

In other cases, the device may not be available to the participant in revocation 400A, so an alternative revocation process may be used as described next with respect to FIG. 4B.

Figure 4B:
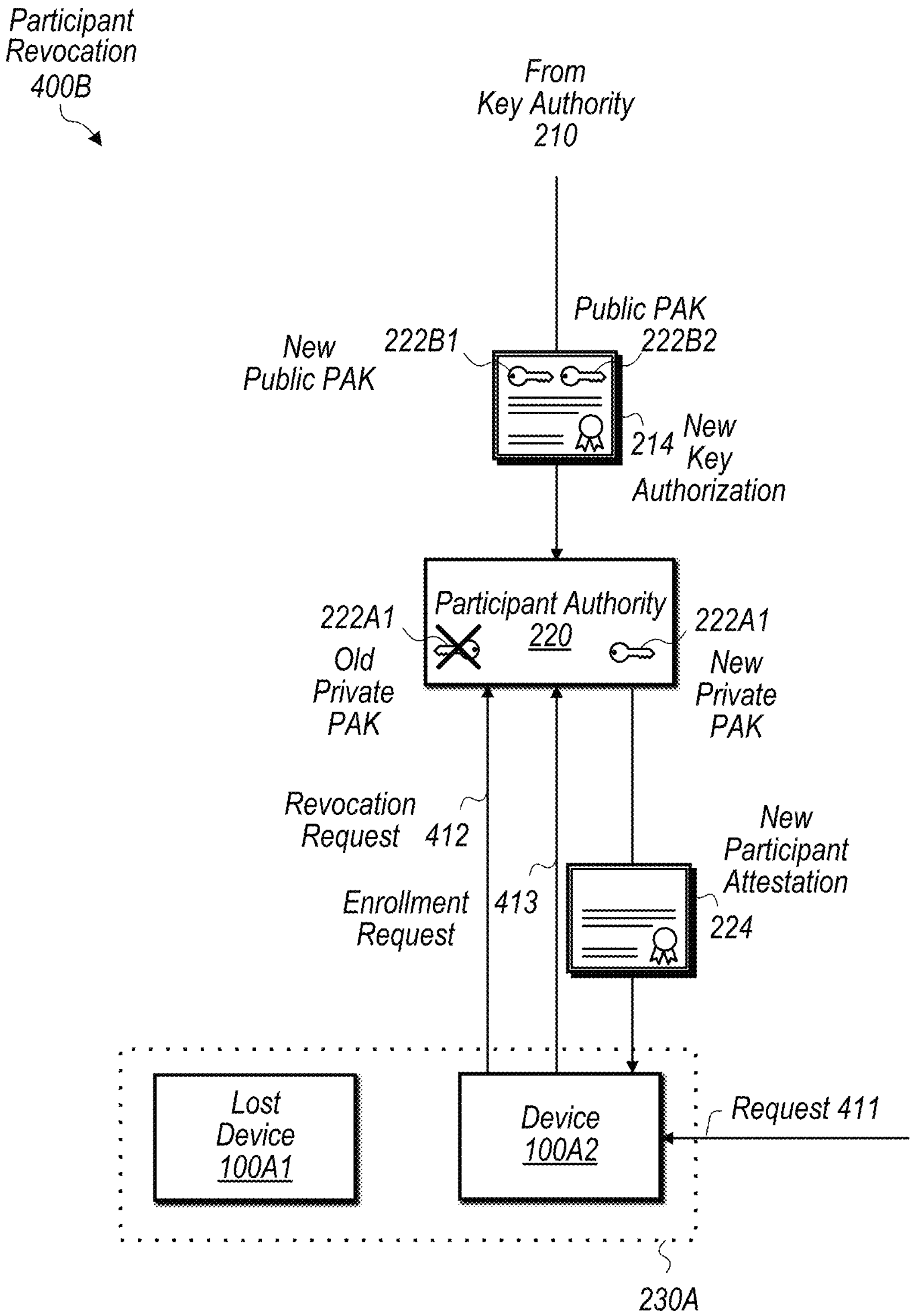

Turning now to FIG. 4B, a block diagram of participant revocation 400B is depicted. In some instances, a device 100A1 may be unavailable to participate in a revocation process if, for example, device 100A1 is offline, stolen, or lost. As such, another device 100A2, which may be a member of the same group 230, may be used to revoke device 100A1's membership via performance of revocation 400B.

As shown, revocation 400B may begin with device 100A2 receiving a request 411 to revoke membership of device 100A1, which may have been lost, for example. In response to request 411, device 100A2 sends a revocation request 412 to its participant authority 220 notifying of the desire to revoke device 100A1. As lost device 100A1 may still be in possession of a PIK pair 232 with a corresponding participant attestation 224, it may make sense to revoke all devices 100 in a given group and reenroll devices 100 that are still members. To achieve this, PA 220 may replace its old PAK pair 222 (including old private PAK 222A1) with a new PAK pair 222 (including new private PAK 222A1) and request that KA 210 issue a new key authorization 214 that includes the new public PAK 222B1. In some embodiments, device 100A2 sends another enrollment request 413 to participant authority 220A to attest to new PIK pair 232 of device 100A2. PA 220 may then send a new participant attestation 224 including the new public PIK 232B. PA 220 may then repeat this process for other valid devices 100 that are still members of the group 230. After performance of revocation 400B, lost device 100A1 no longer has a PIK pair 232 that can be validated using the newly issued key authorization 214—thus preventing it from participating in a key exchange 122 with any other members.

Although not shown, a similar process to revocation 400B may be performed for revoking a given PA 220 in which KA 210 may be contacted to replace a given key authorization 214 with a new key authorization 214 having a new public PAK 222B1 associated with a new PA 220—and a public PAK 222B2 associated with the other remaining PA 220B.

Figure 4C:
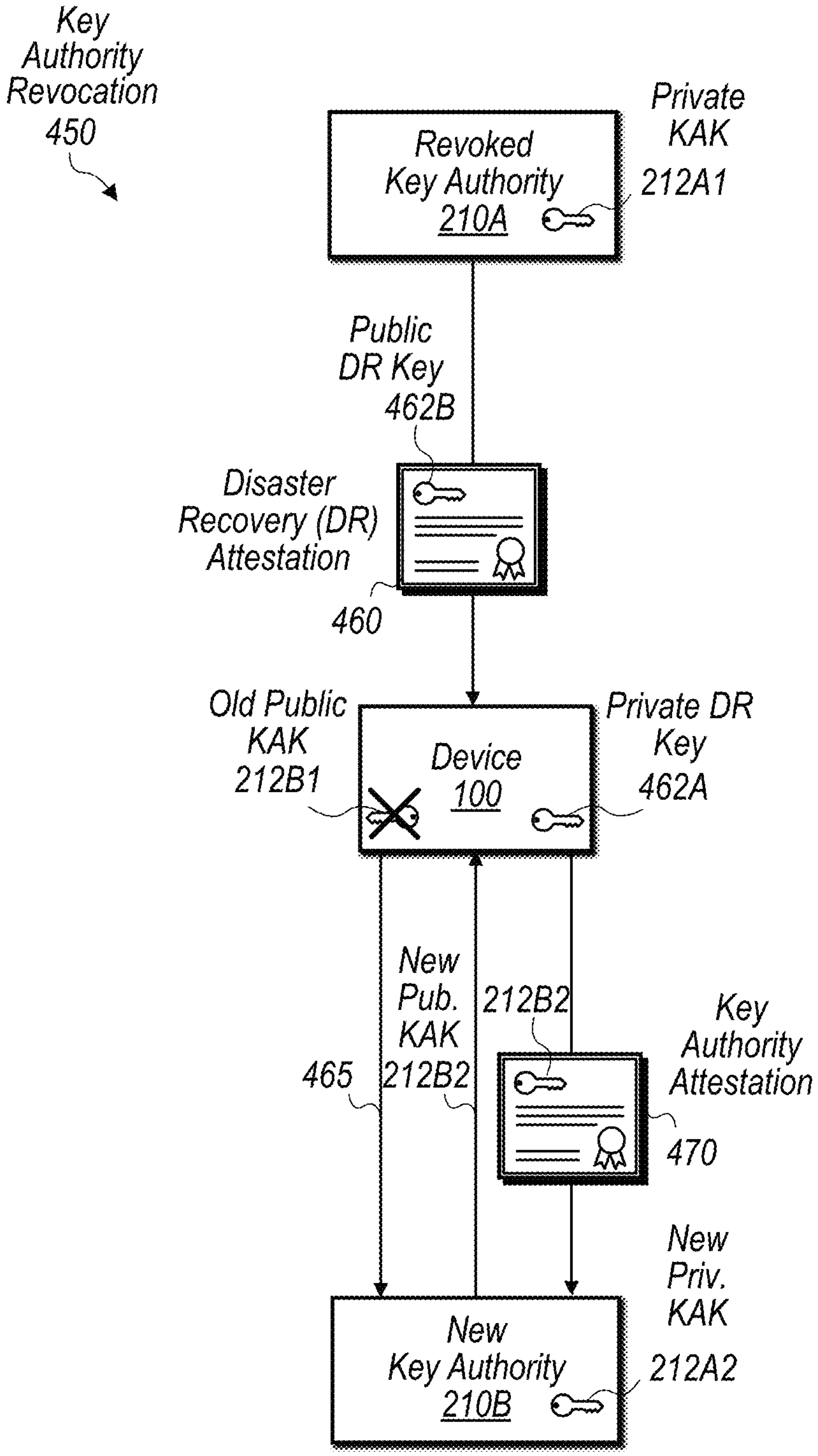

Turning now to FIG. 4C, a block diagram of key authority revocation 450 is depicted. In some instances, it may also be desirable to revoke a particular KA 210—although this may occur infrequently. For example, a server implementing a given KA 210A may lose private KAK212A, become compromised, or suffer some issue preventing it from signing additional key authorizations 214. In the illustrated embodiment, revocation 450 provides a way to not only revoke a prior KA 210A but also enroll a new KA 210B.

In some embodiments, revocation 450 may begin prior to any determination to revoke a given KA 210 such as when authorization hierarchy 200 is initially established. As shown, key authority 210A may initially sign a disaster recovery (DR) attestation 460 for DR key pair 462 to enable its future revocation if such an event becomes warranted. In some embodiments, KA 210A may generate DR key pair 462 and share it with a device 100; in other embodiments, the device 100 generates the pair 462 and provides the public DR key 462B for inclusion in the DR attestation 460.

If revocation of KA 210A becomes warranted, device 100 may use the DR key pair 462 and DR attestation 460 to establish another key authority 210B. As shown, device 100 may delete old public KAK 212B1 (and any key material whose attestation chain depends on old KAK pair 212A) and sends a request 465 to a new key authority 210B asking for its enrollment in hierarchy 200. In response, new KA 210B generates a new KAK pair 212 and sends the new public KAK 212B2 back to device 100, which can use private DR key 462A to sign a new key authority attestation 470 that includes new public KAK 212B2. In some embodiments, device 100 may also use private DR key 462A to sign requests (not shown) for other members of groups 230A and 230B to discontinue use of the revoked key authorization 214 of old KA 210A. Once new KA 210B has received key authority attestation 470, it may proceed to generate key authorizations 214 as part of a new hierarchy 200 that supplants the old hierarchy one. Although depicted as being performed by device 100, another device with access to private DR key 462A may use new key authority attestation 470. For example, the owner of device 100A may share DR key 462A (e.g., from device 100A via a key exchange 122) with another device, which allows the owner to enroll both device 100A and the other device in new hierarchy 200.

Turning now to FIG. 5, a block diagram of secure enclave processor (SEP) 500 is depicted. In the illustrated embodiment, SEP 500 includes a filter 510, secure mailbox mechanism 520, processor 530, secure ROM 540, cryptographic circuit 120, secure memory 130, and a biosensor pipeline 560 coupled together via an interconnect 570. In some embodiments, SEP 500 may include more (or less) components than shown in FIG. 5. In various embodiments, SEP 500 is a secure circuit having tamper resistance. In the illustrated embodiment, SEP 500 implements tamper resistance through the use of filter 510 and secure mailbox 520.

Filter 510 is circuitry configured to tightly control access to SEP 500 to increase the isolation of the SEP 500 from the rest of a device 100, and thus the overall security of device 100. More particularly, in some embodiments, filter 510 may permit read/write operations from processor 102 (or other coupled peripherals coupled to interconnect 502 in some embodiments) to enter SEP 500 only if the operations address the secure mailbox 520. Other operations may not progress from the interconnect 502 into SEP 500. Even more particularly, filter 510 may permit write operations to the address assigned to the inbox portion of secure mailbox 520 and read operations to the address assigned to the outbox portion of the secure mailbox 520. All other read/write operations may be prevented/filtered by filter 510. In some embodiments, filter 510 may respond to other read/write operations with an error. In one embodiment, filter 510 may sink write data associated with a filtered write operation without passing the write data on to local interconnect 570. In one embodiment, filter 510 may supply nonce data as read data for a filtered read operation. Nonce data (e.g., "garbage data") may generally be data that is not associated with the addressed resource within the SEP 500. Filter 510 may supply any data as nonce data (e.g., all zeros, all ones, random data from a random number generator, data programmed into filter 510 to respond as read data, the address of the read transaction, etc.). Thus, filter 510 may prevent direct access to internal components 530-570 by an external entity such as processor 102. In various embodiments, filter 510 may only filter incoming read/write operations. Thus, the components of the SEP 500 may have full access to the other components of computing device 100. Accordingly, filter 510 may not filter responses from interconnect 502 that are provided in response to read/write operations issued by SEP 500.

Secure mailbox 520 is circuitry that, in some embodiments, includes an inbox and an outbox. Both the inbox and the outbox may be first-in, first-out buffers (FIFOs) for data. The buffers may have any size (e.g., any number of entries, where each entry is capable of storing data from a read/write operation). Particularly, the inbox may be configured to store write data from write operations sourced from interconnect 502. The outbox may store write data from write operations sourced by processor 530. (As used herein, a "mailbox mechanism" refers to a memory circuit that temporarily stores 1) an input for a secure circuit until it can be retrieved by the circuit and/or 2) an output of a secure circuit until it can be retrieved by an external circuit.)

In some embodiments, software executing on processor 102, such as application 110, (or other peripherals coupled to interconnect 502) may request services of SEP 500 via an application programming interface (API) supported by an operating system of device 100—i.e., a requester may make API calls that request services of SEP 500. These calls may cause corresponding requests to be written to mailbox mechanism 520, which are then retrieved from mailbox 520 and analyzed by processor 530 to determine whether it should service the requests. Accordingly, this API may be used to send, via mailbox 520, for example, a key exchange request 114, key material 132 received from another device 100 participating in key exchange 122, a sensitive data object 112 for encryption or decryption, biometric data, etc. By isolating SEP 500 in this manner, integrity of SEP 500 may be enhanced-including preventing, for example, a malicious process running on processor 102 from extracting private key material 132, shared secret 134, biometric data, etc.

SEP processor 530 is configured to process commands received from various sources in computing device 100 and may use various secure peripherals to accomplish the commands. Processor 530 may then execute instructions stored in ROM 540 (or elsewhere such as in memory 104) such as manager 542, which may use components of SEP 500 to facilitate performing various actions described above with respect to key exchange 122. For example, in response to receiving request 114 to perform a key exchange 122, SEP processor 530 may execute manager 542 to provide appropriate commands to notify cryptographic circuit 120 of the received request 114. Manager 542 may also interact with other components of SEP 500, which may be facilitating key exchange 122 such as biosensor pipeline 560 if, for example, key exchange 122 (or use of key material 132 or shared secret 134) is predicated on a successful biometric authentication of a user of device 100.

Secure ROM 540 is a memory configured to store program instruction for booting SEP 500. In some embodiments, ROM 540 may respond to only a specific address range assigned to secure ROM 540 on local interconnect 570. The address range may be hardwired, and processor 530 may be hardwired to fetch from the address range at boot in order to boot from secure ROM 540. Filter 510 may filter addresses within the address range assigned to secure ROM 540 (as mentioned above), preventing access to secure ROM 540 from components external to the SEP 500. In some embodiments, secure ROM 540 may include other software executed by SEP processor 530 during use. This software may include the program instructions of manager 542 to perform key exchange 122, process inbox messages and generate outbox messages, etc. In some embodiments, program instructions executed by SEP processor 530 are signed by a trusted authority (e.g., devices 100's manufacturer) in order to ensure their integrity. These program instructions may include those stored in secure ROM 540 and program instructions stored externally such as in memory 104; however, these externally stored program instructions may have their signatures verified by program instructions in ROM 540 prior to being permitted to be executed by processor 530.

Biosensor sensor pipeline 560, in various embodiments, is circuitry configured to authenticate a user by comparing biometric data captured by a biosensor of device 100 from a user being authenticated with a biometric data 562 of an authorized user, which may be stored in memory 104 or elsewhere. As used herein, "biometric data" refers to data that uniquely identifies the user among other humans (at least to a high degree of accuracy) based on the user's physical or behavioral characteristics. In some embodiments, the biosensor is a camera configured to collect facial data of a user's face (or eyes) in order to perform facial recognition (or iris recognition). In other embodiments, the biosensor may be configured to collect other forms of biometric data such voice recognition data, fingerprint data, vein data, etc. In some embodiments, pipeline 560 may perform the comparison using a collection of neural networks included in pipeline 560, each network being configured to compare biometric data captured in a single frame with biometric data captured in multiple frames for an authorized user. As shown, pipeline 560 may be configured to read, from memory 104, biometric data 562, which may be protected by encryption in some embodiments and/or be stored in an associated part of memory 104 that is only accessible to SEP 500. (In another embodiment, SEP 500 may store biometric data 562 internally.) Based on the comparison of biometric data 562, pipeline 560 may provide an authentication result/confirmation indicating whether the authentication was successful or failed, which may be used to determine whether to permit use of private key material and/or shared secret 134 in some embodiments.

Various components of SEP 500 may facilitate cryptographic circuit 120's implementation of key exchange 122 and help improve the security of circuit 120.

Figure 6:
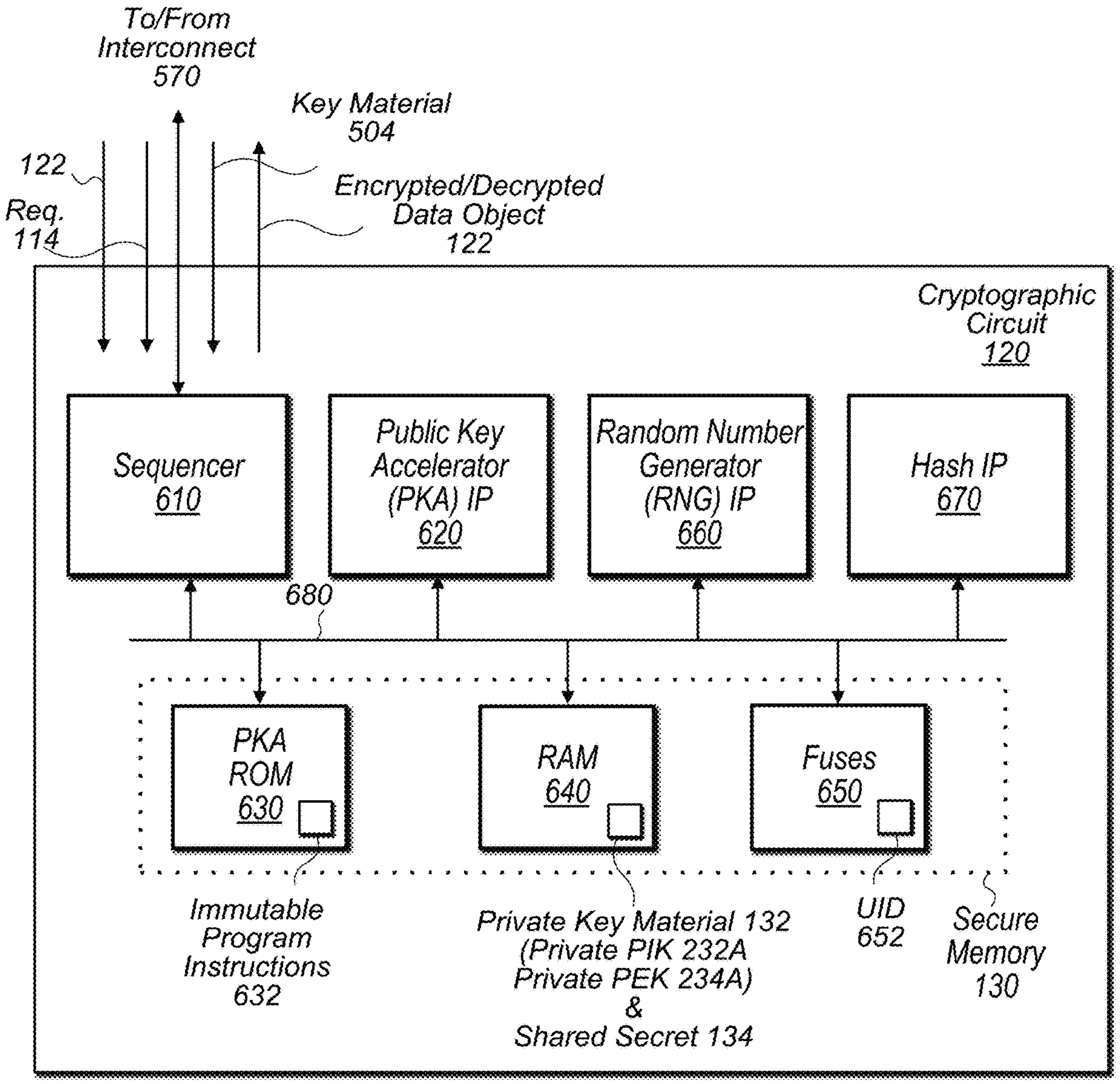
FIG. 6 is a block diagram illustrating an example of cryptographic circuitry including a secure memory that stores private key material.

Turning now to FIG. 6, a block diagram of components within cryptographic circuit 120 is depicted. As shown, cryptographic circuit 120 may include a sequencer 610, public key accelerator (PKA) intellectual property (IP) 620, PKA ROM 630, RAM 640, fuses 650, random number generator (RNG) IP 660, and hash IP 670 connected using interconnect 680. In the illustrated embodiment, secure memory 130 includes ROM 630, RAM 640, and fuses 650. In other embodiments, circuit 120 may be implemented differently and include more (or less) components—e.g., RNG IP 660 and hash IP 670 may be external to circuit 120 but included in SEP 500, secure memory 130 may not include fuses 550, etc.

Sequencer 610 is circuitry configured to decode commands received from SEP processor 530 and generate a series of subcommands/program instructions for PKA IP 620 (or other components in cryptographic circuit 120) to implement the commands. For example, these commands may include ones to generate key pairs of private key material 132, encrypt or decrypt data using key pairs, sign data, verify data, implement ECDH, etc. They may also include commands to generate random numbers and hash values for RNG IP 660 and hash IP 670. In the illustrated embodiment, sequencer 610 accesses PKA ROM 630 to retrieve subcommands to provide to components in cryptographic circuit 120. In some embodiments, sequence 610 may employ logic and/or program instructions stored ROM 630 to decode received commands and issue corresponding subcommands.

PKA IP 620 is circuitry configured to perform various public key cryptographic operations with respect to private key material 132 such as those noted above to implement key exchange 122. Accordingly, PKA IP 620 may include logic to implement Rivest Shamir Adleman (RSA), Digital Signature Algorithm (DSA), elliptic curve cryptography (ECC), etc. Although described as a public key accelerator, IP 620 may support other cryptographic algorithms such as those noted above. In some embodiments, PKA IP 620 may be the only circuitry able to access private key material 132 in secure memory 130. PKA IP 620 may also interact with other components in cryptographic circuit 120 such as RNG IP 660 and hash IP 670 in order to implement various actions such as key and signature generation, signature validation, etc.

PKA ROM 630 is a ROM configured to store immutable program instructions 632 executable by components of cryptographic circuit 120 to perform the various operations described herein with respect to circuit 120 including performance of key exchange 122. In various embodiments, these instructions are stored in ROM 630 during fabrication—and thus known to be trustworthy. During fabrication, ROM 630 may also be provisioned with static data used by circuit 120. As noted above, by storing program instructions 632 and data in ROM 630 to make them immutable, the security of cryptographic circuit 120 (and thus key exchange 122) is improved.

RAM 640 is a RAM configured to store various intermediate results generated by PKA IP 620 during operation. In the illustrated embodiment, the results include private PIK 232A and private PEK 234A—or other components of private key material 132. RAM 640 may also include shared secret 134, key material received from device 100B, key authorizations 214, participant attestations 224, etc. To further enhance security, cryptographic circuit 120 may execute a sequence of program instructions in a particular order to perform the key exchange and prevent out of order execution of the sequence by clearing portions of the secure memory between executing instructions in order to prevent instructions executed out of order from influencing subsequently executed instructions. For example, zeros (or some other default value) may be written, in response to receiving a given program instruction in the sequence, to a portion of the secure memory used by the next program instruction in the particular order.

Fuses 650 is a fuse bank configured to store key material usable by cryptographic circuit 120 to derive a portion of private key material 132 used in key exchange 122. In the illustrated embodiment, this key material includes a unique identifier (UID) 652 that uniquely identifies device 100A from other devices. This key material may also include a generation identifier (GID) unique to a particular generation of devices, etc. These values may be recorded at fabrication of device 100A by burning various ones of fuses 650. In various embodiments, fuses 650 are inaccessible to components external to cryptographic circuit 120 (or external to SEP 500) such as processor 102.

RNG IP 660 is circuitry configured to generate random numbers for use by various components in cryptographic circuit 120. Accordingly, RNG IP 660 may provide a random value to PKA IP 620 for storage in RAM 640 as a portion of private key material 132. Although RNG IP 660 may, in some embodiments, implement a pseudo-random number generator, RNG IP 660, in other embodiments, implements a truly random number generator that uses external sources of randomness such as measured temperatures, etc. In various embodiments, RNG IP 660 is inaccessible to components external to SEP 500 such as processor 102.

Hash IP 670 is circuitry configured to implement any suitable hash algorithm such as secure hash algorithms (SHA), hash-based message authentication code (HMAC), etc., which may be used by components in SEP 500. Accordingly, hash IP 670 may generate hash values that are encrypted/signed by PKA IP 620—or compared in signature verifications by PKA IP 620.

Figure 7:
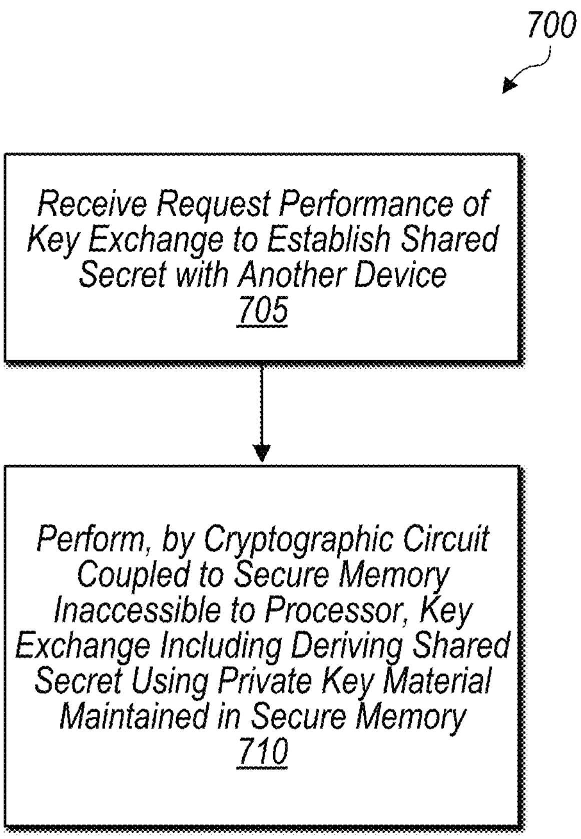
FIG. 7 is a flow diagram illustrating an example of a method performed by a device participating in the secure key exchange.

Turning now to FIG. 7, a flow diagram of a method 700 for establishing a shared secret between two devices is depicted. Method 700 is one embodiment of a method performed by a computing device such as device 100A, which may include cryptographic circuit 120. In some instances, performance of method 700 may allow for a device (e.g., device 100A) to establish a shared secret (e.g., shared secret 134) without revealing key material (e.g., private key material 132) to unsecure components of the device.

In step 705, performance of a key exchange (e.g., key exchange 122) is requested (e.g., via a request 114) to establish a shared secret with another device (e.g., device 100B).

In step 710, the cryptographic circuit (e.g., cryptographic circuit 120) performs the key exchange, which includes deriving the shared secret using private key material maintained in a secure memory (e.g., secure memory 130). In some embodiments, deriving the shared secret includes performing Elliptic-curve Diffie-Hellman (ECDH) using the private key material. In some embodiments, the processor exchanges with the other device sensitive data (e.g., a symmetric key, an asymmetric private key, an authentication credential, a transaction credential, etc.) encrypted using the derived shared secret. In some embodiments, the cryptographic circuit is a public key accelerator (e.g., PKA IP 620).

In some embodiments, the device further comprises a read only memory (ROM) (e.g., PKA ROM 630) storing immutable program instructions that are executable by the cryptographic circuit to perform the key exchange. In some embodiments, the cryptographic circuit is further configured to execute a sequence of program instructions in a particular order to perform the key exchange and prevents out of order execution of the sequence by clearing, in response to receiving a given program instruction in the sequence, a portion of the secure memory used by the next program instruction in the particular order.

In some embodiments, method 700 further includes the cryptographic circuit verifying a key authorization data structure (e.g., key authorization 214) from a key authority (e.g., key authority 210) to indicate that the computing device is authorized to participate in a key exchange with the other device, where the key authorization data structure includes a public key (e.g., public PAK 222B1) associated with the computing device and a public key (e.g., public PAK 222B2) associated with the other device. In some embodiments, the key authorization data structure indicates an authorization for a key exchange between a first device group (e.g., device group 230A) and a second device group (e.g., device group 230B), where the public key associated with the computing device is of a first participant authority (e.g., participant authority 220A) authorized to identify the computing device as a member of the first device group, and the public key associated with the other device is of a second participant authority (e.g., participant authority 220B) authorized to identify the other device as a member of the second device group.

In some embodiments, method 700 further includes a random number generator circuit (e.g., RNG IP 660) coupled to the cryptographic circuit and inaccessible to the processor providing a random value to the cryptographic circuit for storage in the secure memory as a portion of the private key material. In some embodiments, a fuse bank (e.g., fuses 650) coupled to the cryptographic circuit and inaccessible to the processor, is configured at fabrication of the cryptographic circuit to store key material (e.g., UID 652) usable by the cryptographic circuit to derive a portion of the private key material stored in the secure memory.

In some embodiments, method 700 further includes determining whether the key exchange is authorized by verifying a plurality of attestations (e.g., participant attestation 224) associated with public key pairs exchanged during the key exchange. The plurality of attestations may include a first key attestation (participant attestation 224) identifying a public key of the computing device (e.g., public PIK 232B) as corresponding to a member of the first device group (e.g., device group 230A) and a second key attestation identifying a public key of the other device as corresponding to a member of the second device group (e.g., device group 230B). The plurality of attestations may further include a key exchange authorization (e.g., key authorization 214) identifying a first public key (e.g., public PAK 222B1) of a first participant authority (e.g., participant authority 220A) that identifies the public key of the computing device as corresponding to a member of the first device group and a second public key (e.g., public PAK 222B2) of a second participant authority (e.g., participant authority 220B) that identifies the public key of the other device as corresponding to a member of the second device group.

In some embodiments, a disaster recovery (DR) key pair (e.g., keys 462A-B) generated by the key authority (e.g., revoked key authority 210A) is received in response to issuing the key authorization data structure. In such an embodiment, in response to the key authority being subsequently revoked (e.g., via key authority revocation 450), the DR key pair is used to establish another key authority (e.g., new key authority 210B).

Figure 8A:
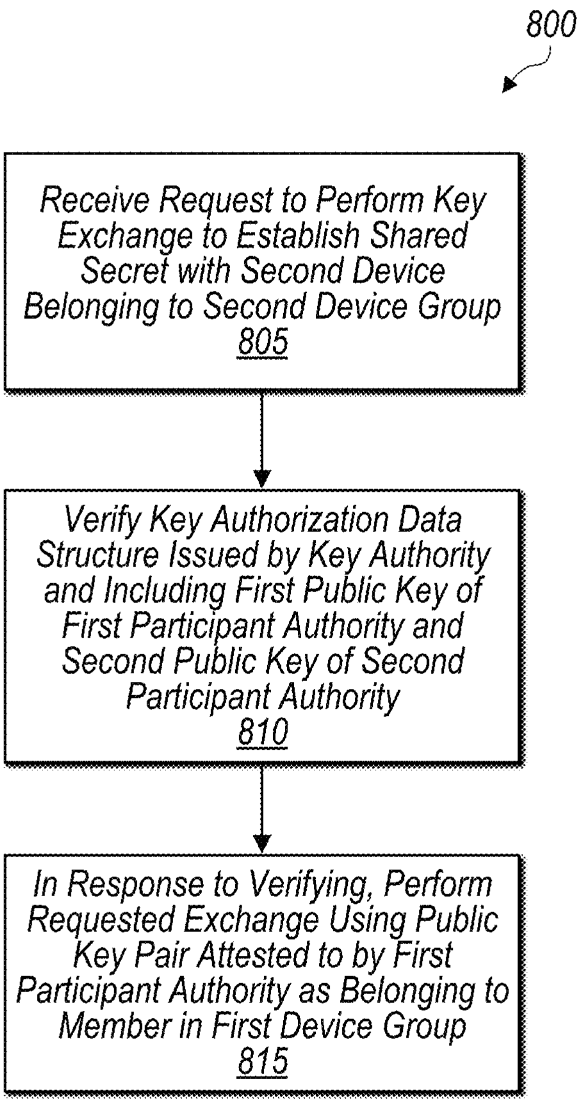
FIGS. 8A-8C are flow diagrams illustrating additional examples of methods for facilitating the secure key exchange.

Turning now to FIG. 8A, a flow diagram of a method 800 for establishing a shared secret between two devices is depicted. Method 800 is another embodiment of a method performed by a first computing device, such as device 100A, belonging to a first device group, such as device group 230A. In some instances, performance of method 800 may allow a key exchange to be performed more securely as participants can be verified using an authorization hierarchy.

In step 805, the computing system receives a request (e.g., request 114) to perform a key exchange (e.g., key exchange 122) to establish a shared secret (e.g., shared secret 134) with a second device (e.g., device 100B) belonging to a second device group (e.g., device group 230B).

In step 810, the computing system verifies a key authorization data structure (e.g., key authorization 214) issued by a key authority (e.g., key authority 210), where the key authorization data structure includes a first public key (e.g., public PAK 222B1) of a first participant authority (e.g., participant authority 220A) authorized to identify members of the first device group and a second public key (e.g., public PAK 222B2) of a second participant authority (e.g., participant authority 220B) authorized to identify members of the second device group.

In step 815, the computing device in response to the verifying being successful, performs the requested exchange using a public key pair (e.g., PEK pair 234) attested to by the first participant authority as belonging to a member in the first device group. In some embodiments, method 800 further includes exchanging with the second device sensitive data (e.g., a symmetric key, a user authentication credential, an asymmetric (private) key) encrypted using the established shared secret.

In some embodiments, method 800 further includes generating a participant identify key (PIK) pair (e.g., PIKs 232A-B) associated with an identity of the first device and sending a request for the first participant authority to issue an attestation identifying the PIK pair as being associated with a member of the first device group. In such an embodiment, the generating may include deriving the PIK pair using previously stored key material (e.g., UID 652) trusted by the first participant authority and usable by the first participant authority to establish that the first device is a member of the first device group. In some embodiments, the request includes account information for a user account associated with each of the first device group and usable by the first participant authority to determine that the first device is a member of the first device group. In some embodiments, performing the requested exchange may include generating an ephemeral first participant exchange key (PEK) pair (e.g., PEK pair 234) attested to by the PIK pair, exchanging, with the second device, public keys of the first PEK pair and of a second PEK pair generated by the second device, and deriving the shared secret by performing elliptic-curve Diffie-Hellman (ECDH) using a private key of the first PEK pair and the exchanged public key of the second PEK pair.

In some embodiments, method 800 further includes receiving a revocation request (e.g., revocation request 402) to revoke the first device's membership in the first device group and in response to the revocation request, deleting the public key pair attested to by the first participant authority and sending, to the first participant authority, a request to remove the first device from the first device group. In some embodiments, method 800 further includes receiving a revocation request (e.g., revocation request 412) to revoke membership of another device (e.g., lost device 100A1) in the first device group and in response to the revocation request, sending a request to the first participant authority to replace the first public key of the first participant authority with another public key (e.g., new public PAK 222B1) and sending a request to the first participant authority to attest to another public key pair (e.g., via new participant attestation 224) using a private key (e.g., new private PAK 222A1) corresponding to the other public key.

In some embodiments, method 800 further includes receiving a disaster recovery (DR) key pair (e.g., DR Keys 462A-B associated with DR attestation 460) attested to by the key authority and in response to determining that revocation of the key authority is warranted, signing, with a private key (e.g., private DR key 462A) of the DR key pair, requests for members of the first and second device groups to discontinue use of the key authorization data structure, and signing, with the private key of the DR key pair, an attestation (e.g., key authority attestation 470) establishing another key authority (e.g., new key authority 210B) for authorizing key exchanges between the first and second device groups.

Figure 8B:
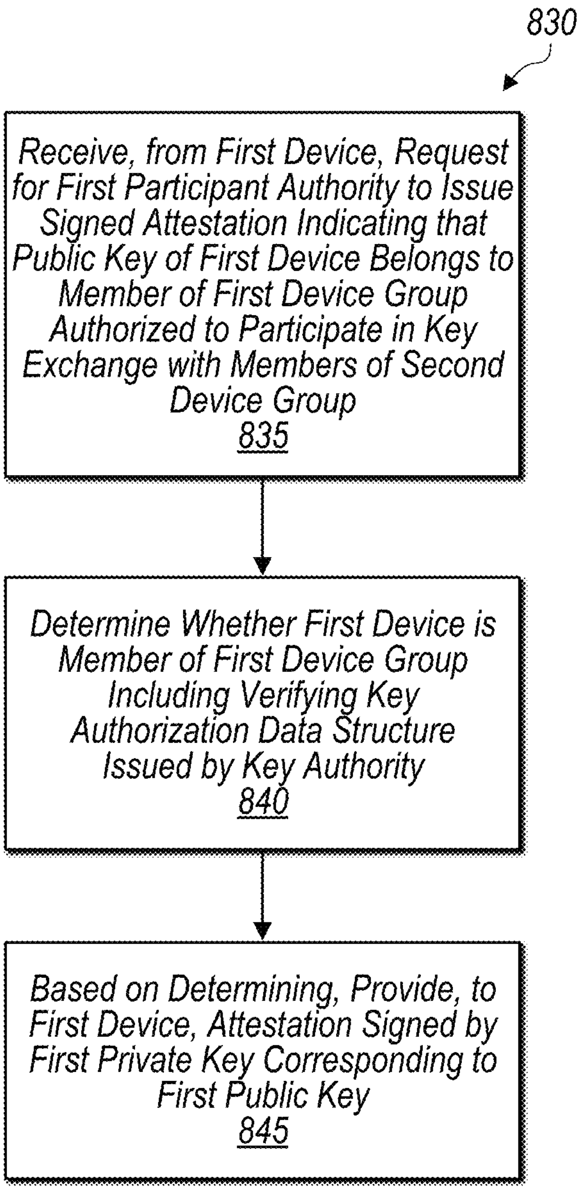

Turning now to FIG. 8B, a flow diagram of a method 830 for providing attestations is depicted. Method 830 is one embodiment of a method performed by a participant authority, such as participant authority 220A. In some instances, performance of method 830 may provide benefits similar to those noted above with method 800.

In step 835, the participant authority receives, from a first device (e.g., device 100A), a request for the first participant authority to issue a signed attestation (e.g., participant attestation 224) indicating that a public key (e.g., public PIK 232B) of the first device belongs to a member of a first device group (e.g., device group 230A) authorized to participate in a key exchange (e.g., key exchange 122) with members of a second device group (e.g., device group 230B).

In step 840, the participant authority determines whether the first device is a member of the first device group including verifying a key authorization data structure (e.g., key authorization 214) issued by a key authority (e.g., key authority 210), where the key authorization data structure includes a first public key (e.g., public PAK 222B1) of the first participant authority authorized to identify members of the first device group and a second public key (e.g., public PAK 222B2) of a second participant authority (e.g., participant authority 220B) authorized to identify members of the second device group.

In step 845, the participant authority provides to the first device, based on the determining, the attestation signed by a first private key (e.g., private PAK 222A1) corresponding to the first public key.

Figure 8C:
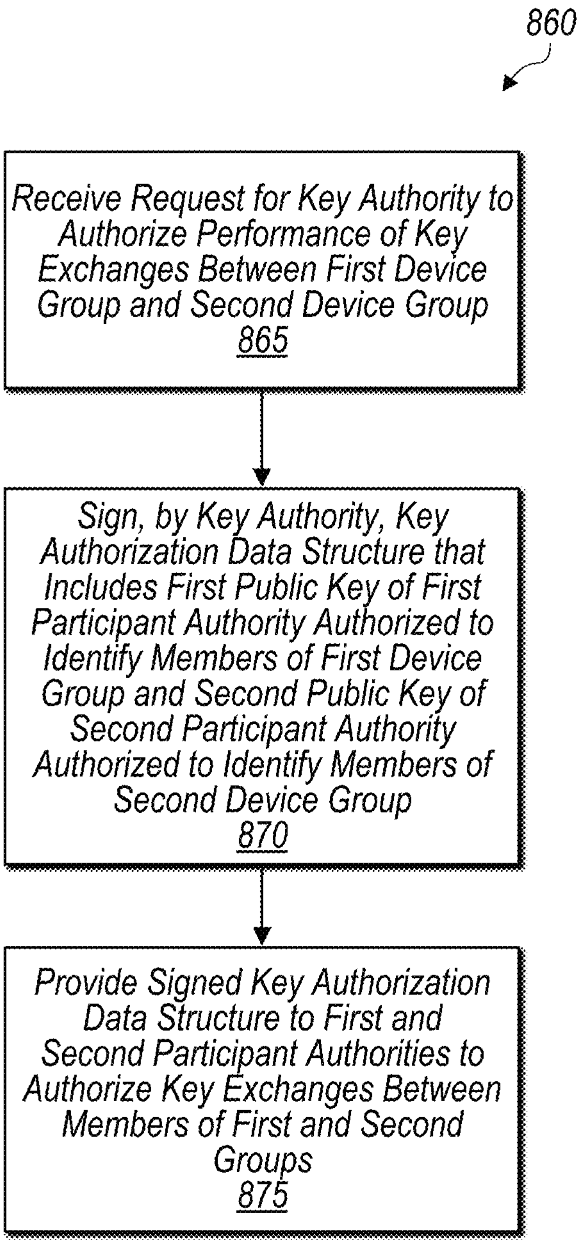

Turning now to FIG. 8C, a flow diagram of a method 860 for providing key authorizations is depicted. Method 860 is one embodiment of a method performed by a key authority, such as key authority 210. In some instances, performance of method 860 may provide benefits similar to those noted above with method 800.

In step 865, the key authority receives a request to authorize performance of key exchanges (e.g., key exchange 122) between a first device group (e.g., device group 230A) and a second device group (e.g., device group 230B).

In step 870, the key authority signs a key authorization data structure (e.g., key authorization 214) that includes a first public key (e.g., public PAK 222B1) of a first participant authority (e.g., participant authority 220A) authorized to identify members of the first device group (e.g., device group 230A) and a second public key (e.g., public PAK 222B2) of a second participant authority (e.g., participant authority 220B) authorized to identify members of the second device group (e.g., device group 230B).

In step 875, the key authority provides the signed key authorization data structure to the first and second participant authorities to authorize performance of key exchanges between members of the first and second device groups.

Exemplary Computer System

Figure 9:
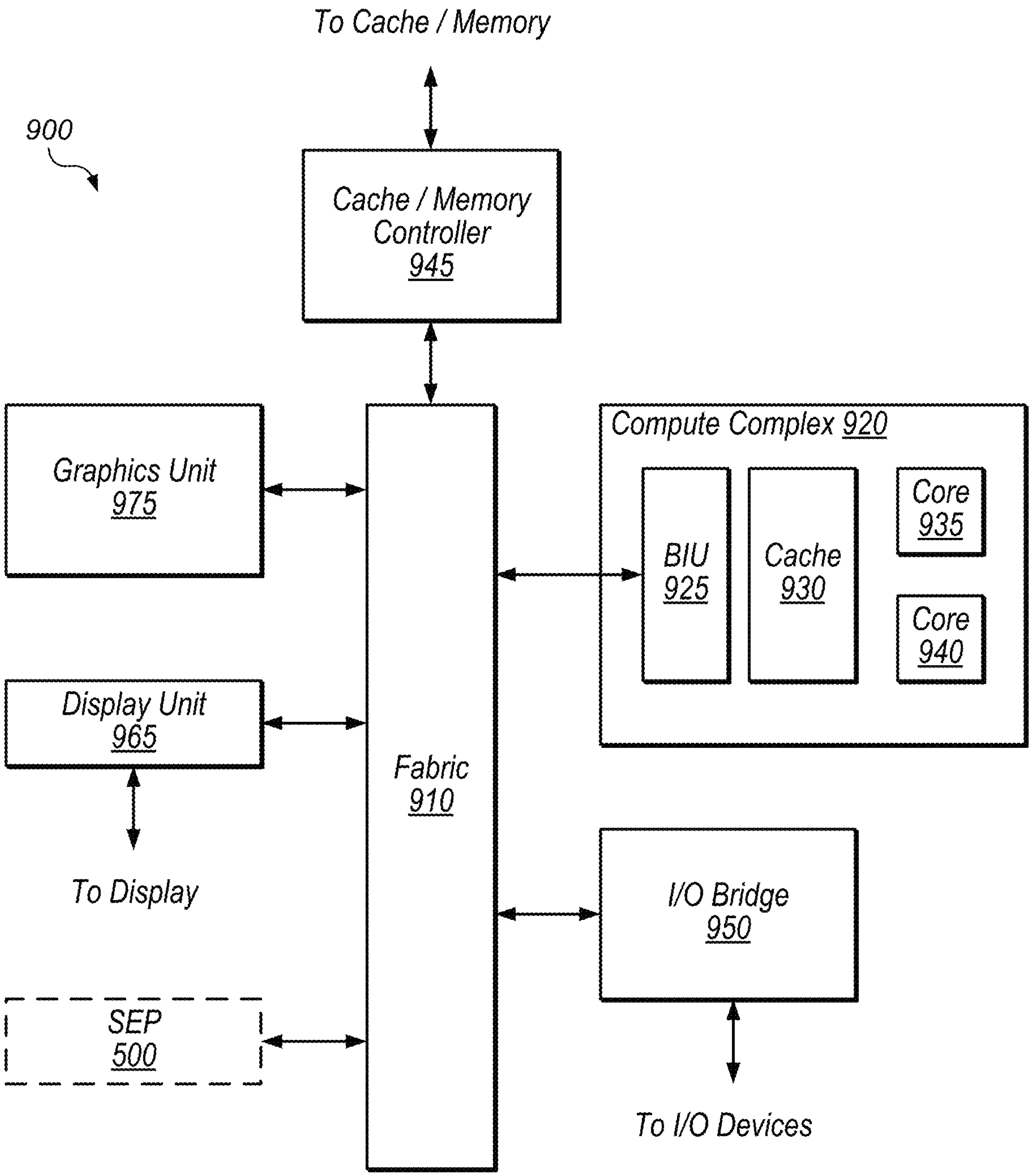
FIG. 9 is a block diagram illustrating an example computing device for implementing the disclosed techniques.

Referring now to FIG. 9, a block diagram illustrating an example embodiment of a device 900 is shown. In some embodiments, device 900 may implement functionality of one or both devices 100A and 100B. In some embodiments, elements of device 900 may be included within a system on a chip. In some embodiments, device 900 may be included in a mobile device, which may be battery powered. Therefore, power consumption by device 900 may be an important design consideration. In the illustrated embodiment, device 900 includes fabric 910, compute complex 920 input/output (I/O) bridge 950, cache/memory controller 945, graphics unit 975, display unit 965, and SEP 500. In some embodiments, device 900 may include other components (not shown) in addition to or in place of the illustrated components, such as video processor encoders and decoders, image processing or recognition elements, computer vision elements, etc.

Fabric 910 may include various interconnects, buses, MUX's, controllers, etc., and may be configured to facilitate communication between various elements of device 900. In some embodiments, portions of fabric 910 may be configured to implement various different communication protocols. In other embodiments, fabric 910 may implement a single communication protocol and elements coupled to fabric 910 may convert from the single communication protocol to other communication protocols internally.

In the illustrated embodiment, compute complex 920 includes bus interface unit (BIU) 925, cache 930, and cores 935 and 940. In various embodiments, compute complex 920 may include various numbers of processors, processor cores and caches. For example, compute complex 920 may include 1, 2, or 4 processor cores, or any other suitable number. In one embodiment, cache 930 is a set associative L2 cache. In some embodiments, cores 935 and 940 may include internal instruction and data caches. In some embodiments, a coherency unit (not shown) in fabric 910, cache 930, or elsewhere in device 900 may be configured to maintain coherency between various caches of device 900. BIU 925 may be configured to manage communication between compute complex 920 and other elements of device 900. Processor cores such as cores 935 and 940 may be configured to execute instructions of a particular instruction set architecture (ISA) which may include operating system instructions and user application instructions. These instructions may be stored in computer readable medium such as a memory coupled to memory controller 945 discussed below. In some embodiments, compute complex may implement processor 102 discussed above.

As used herein, the term "coupled to" may indicate one or more connections between elements, and a coupling may include intervening elements. For example, in FIG. 9, graphics unit 975 may be described as "coupled to" a memory through fabric 910 and cache/memory controller 945. In contrast, in the illustrated embodiment of FIG. 9, graphics unit 975 is "directly coupled" to fabric 910 because there are no intervening elements.

Cache/memory controller 945 may be configured to manage transfer of data between fabric 910 and one or more caches and memories. For example, cache/memory controller 945 may be coupled to an L3 cache, which may in turn be coupled to a system memory. In other embodiments, cache/memory controller 945 may be directly coupled to a memory. In some embodiments, cache/memory controller 945 may include one or more internal caches. Memory coupled to controller 945 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 945 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions, such as those of application 110, executable by compute complex 920 to cause the computing device to perform functionality described herein.

Graphics unit 975 may include one or more processors, e.g., one or more graphics processing units (GPUs). Graphics unit 975 may receive graphics-oriented instructions, such as OPENGL®, Metal®, or DIRECT3D® instructions, for example. Graphics unit 975 may execute specialized GPU instructions or perform other operations based on the received graphics-oriented instructions. Graphics unit 975 may generally be configured to process large blocks of data in parallel and may build images in a frame buffer for output to a display, which may be included in the device or may be a separate device. Graphics unit 975 may include transform, lighting, triangle, and rendering engines in one or more graphics processing pipelines. Graphics unit 975 may output pixel information for display images. Graphics unit 975, in various embodiments, may include programmable shader circuitry which may include highly parallel execution cores configured to execute graphics programs, which may include pixel tasks, vertex tasks, and compute tasks (which may or may not be graphics-related).

Display unit 965 may be configured to read data from a frame buffer and provide a stream of pixel values for display. Display unit 965 may be configured as a display pipeline in some embodiments. Additionally, display unit 965 may be configured to blend multiple frames to produce an output frame. Further, display unit 965 may include one or more interfaces (e.g., MIPI® or embedded display port (eDP)) for coupling to a user display (e.g., a touchscreen or an external display).

I/O bridge 950 may include various elements configured to implement: universal serial bus (USB) communications, security, audio, and low-power always-on functionality, for example. I/O bridge 950 may also include interfaces such as pulse-width modulation (PWM), general-purpose input/output (GPIO), serial peripheral interface (SPI), and inter-integrated circuit (I2C), for example. Various types of peripherals and devices may be coupled to device 900 via I/O bridge 950.

In some embodiments, device 900 includes network interface circuitry (not explicitly shown), which may be connected to fabric 910 or I/O bridge 950. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 900 with connectivity to various types of other devices and networks.

Example Applications

Figure 10:
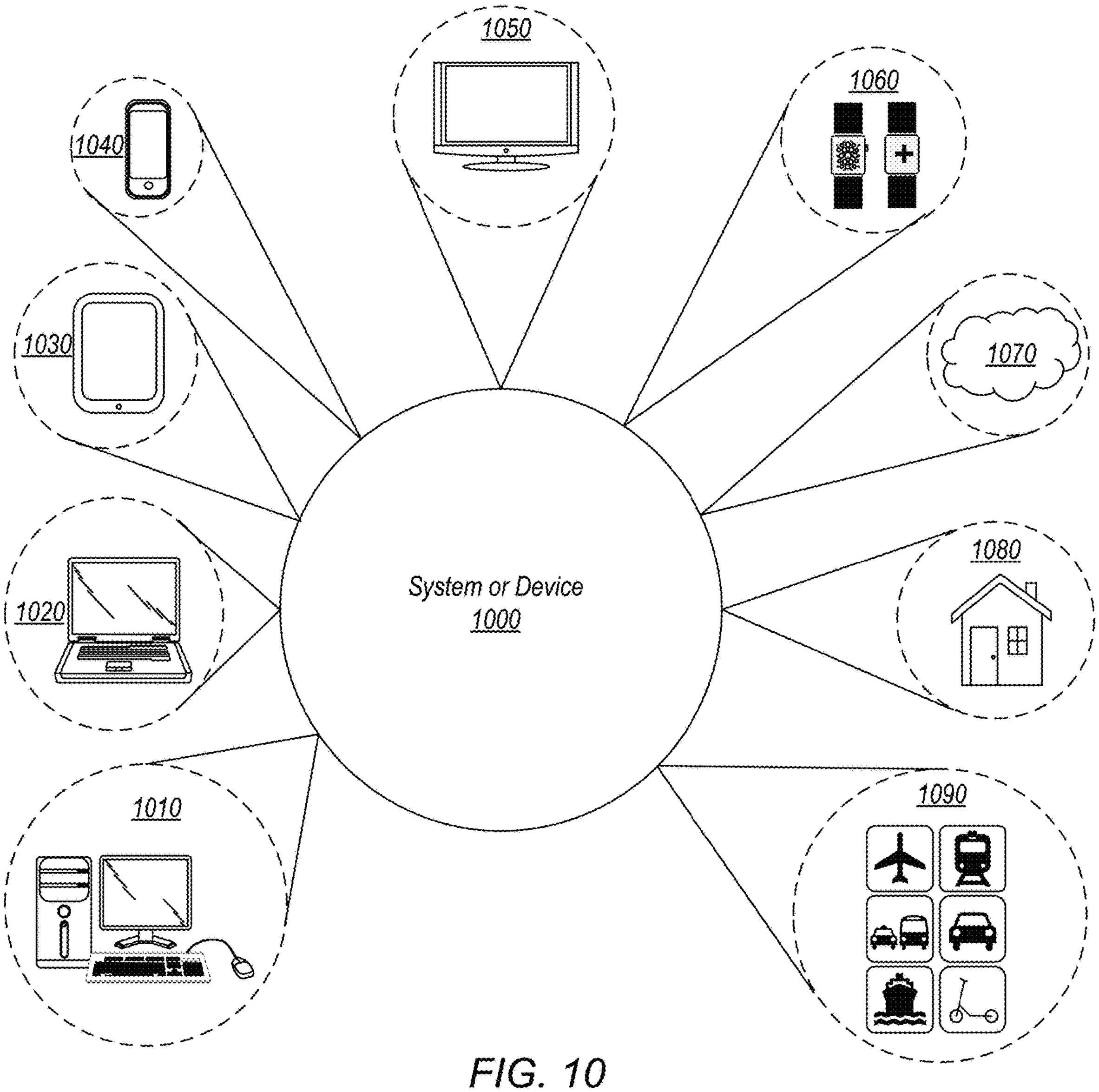
FIG. 10 is a diagram illustrating example applications for systems and devices employing the disclosed techniques.

Turning now to FIG. 10, various types of systems that may include any of the circuits, devices, or system discussed above. System or device 1000, which may incorporate or otherwise utilize one or more of the techniques described herein, may be utilized in a wide range of areas. For example, system or device 1000 may be utilized as part of the hardware of systems such as a desktop computer 1010, laptop computer 1020, tablet computer 1030, cellular or mobile phone 1040, or television 1050 (or set-top box coupled to a television).

Similarly, disclosed elements may be utilized in a wearable device 1060, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1000 may also be used in various other contexts. For example, system or device 1000 may be utilized in the context of a server computer system, such as a dedicated server or on shared hardware that implements a cloud-based service 1070. Still further, system or device 1000 may be implemented in a wide range of specialized everyday devices, including devices 1080 commonly found in the home such as refrigerators, thermostats, security cameras, etc. The interconnection of such devices is often referred to as the "Internet of Things" (IoT). Elements may also be implemented in various modes of transportation. For example, system or device 1000 could be employed in the control systems, guidance systems, entertainment systems, etc. of various types of vehicles 1090.

The applications illustrated in FIG. 10 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 11:
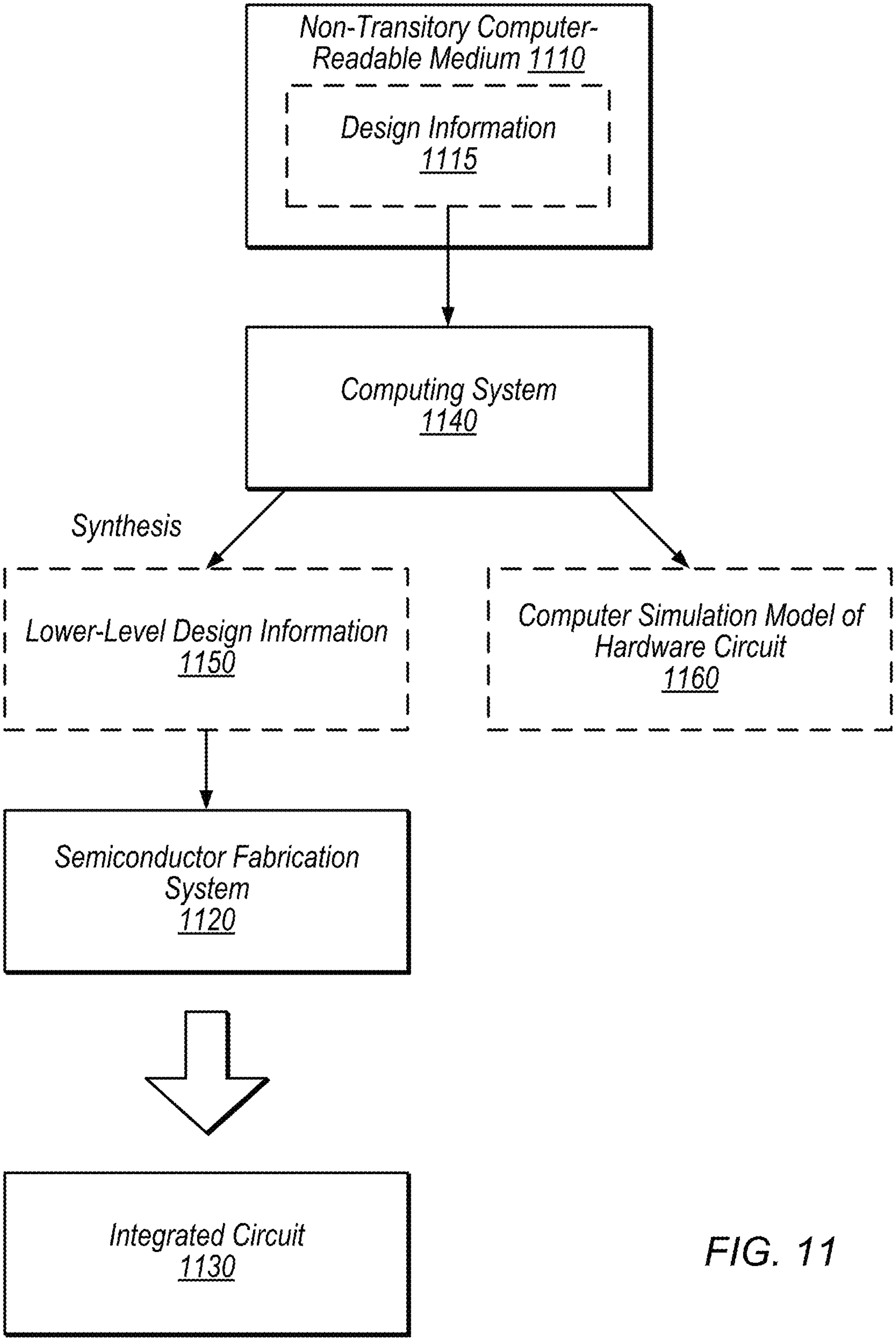
FIG. 11 is a block diagram illustrating an example computer-readable medium that stores circuit design information for implementing devices that employ the disclosed techniques.

FIG. 11 is a block diagram illustrating an example non-transitory computer-readable storage medium that stores circuit design information, according to some embodiments. In the illustrated embodiment, computing system 1140 is configured to process the design information. This may include executing instructions included in the design information, interpreting instructions included in the design information, compiling, transforming, or otherwise updating the design information, etc. Therefore, the design information controls computing system 1140 (e.g., by programming computing system 1140) to perform various operations discussed below, in some embodiments.

In the illustrated example, computing system 1140 processes the design information to generate both a computer simulation model of a hardware circuit 1160 and lower-level design information 1150. In other embodiments, computing system 1140 may generate only one of these outputs, may generate other outputs based on the design information, or both. Regarding the computing simulation, computing system 1140 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 1140 also processes the design information to generate lower-level design information 1150 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 1150 (potentially among other inputs), semiconductor fabrication system 1120 is configured to fabricate an integrated circuit 1130 (which may correspond to functionality of the simulation model 1160). Note that computing system 1140 may generate different simulation models based on design information at various levels of description, including information 1150, 1115, and so on. The data representing design information 1150 and model 1160 may be stored on medium 1110 or on one or more other media.

In some embodiments, the lower-level design information 1150 controls (e.g., programs) the semiconductor fabrication system 1120 to fabricate the integrated circuit 1130. Thus, when processed by the fabrication system, the design information may program the fabrication system to fabricate a circuit that includes various circuitry disclosed herein.

Non-transitory computer-readable storage medium 1110, may comprise any of various appropriate types of memory devices or storage devices. Non-transitory computer-readable storage medium 1110 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1110 may include other types of non-transitory memory as well or combinations thereof. Accordingly, non-transitory computer-readable storage medium 1110 may include two or more memory media; such media may reside in different locations—for example, in different computer systems that are connected over a network.

Design information 1115 may be specified using any of various appropriate computer languages, including hardware description languages such as, without limitation: VHDL, Verilog, SystemC, System Verilog, RHDL, M, MyHDL, etc. The format of various design information may be recognized by one or more applications executed by computing system 1140, semiconductor fabrication system 1120, or both. In some embodiments, design information may also include one or more cell libraries that specify the synthesis, layout, or both of integrated circuit 1130. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 1130 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 1120 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1120 may also be configured to perform various testing of fabricated circuits for correct operation.

In various embodiments, integrated circuit 1130 and model 1160 are configured to operate according to a circuit design specified by design information 1115, which may include performing any of the functionality described herein. For example, integrated circuit 1130 may include any of various elements shown in FIG. 1 such as cryptographic circuit 120 and secure memory 130. Further, integrated circuit 1130 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 1120 to fabricate integrated circuit 1130.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of U.S. patent applications based on this disclosure, reciting in a claim that a structure is "configured to" perform one or more tasks is expressly intended not to invoke 35 U.S.C. § 112 (f) for that claim element. Should Applicant wish to invoke Section 112(f) during prosecution of a U.S. patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A non-transitory computer readable medium having program instructions stored therein that are executable by a first device belonging to a first device group to cause the first device to perform operations comprising:

- receiving a request to perform a key exchange to establish a shared secret with a second device belonging to a second device group, wherein the second device group is different from the first device group;
- verifying a key authorization data structure issued by a key authority, wherein the key authorization data structure includes a first public key of a first participant authority authorized to identify members of the first device group and a second public key of a second participant authority authorized to identify members of the second device group; and
- in response to the verifying being successful, performing the requested exchange using a public key pair attested to by the first participant authority as belonging to a member in the first device group.

2. The computer readable medium of claim 1, wherein the operations further comprise:

- generating a participant identity key (PIK) pair associated with an identity of the first device; and
- sending a request for the first participant authority to issue an attestation identifying the PIK pair as being associated with a member of the first device group.

3. The computer readable medium of claim 2, wherein the request includes account information for a user account associated with each of the first device group and usable by the first participant authority to determine that the first device is a member of the first device group.

4. The computer readable medium of claim 2, wherein the generating includes:

- deriving the PIK pair using previously stored key material trusted by the first participant authority and usable by the first participant authority to establish that the first device is a member of the first device group.

5. The computer readable medium of claim 2, wherein performing the requested exchange includes:

- generating an ephemeral first participant exchange key (PEK) pair attested to by the PIK pair;
- exchanging, with the second device, public keys of the first PEK pair and of a second PEK pair generated by the second device; and
- deriving the shared secret by performing elliptic-curve Diffie-Hellman (ECDH) using a private key of the first PEK pair and the exchanged public key of the second PEK pair.

6. The computer readable medium of claim 1, wherein the operations further comprise:

- receiving a revocation request to revoke the first device's membership in the first device group;
- in response to the revocation request:
  - deleting the public key pair attested to by the first participant authority; and
  - sending, to the first participant authority, a request to remove the first device from the first device group.

7. The computer readable medium of claim 1, wherein the operations further comprise:

- receiving a revocation request to revoke membership of another device in the first device group;
- in response to the revocation request:
  - sending a request to the first participant authority to replace the first public key of the first participant authority with another public key; and
  - sending a request to the first participant authority to attest to another public key pair using a private key corresponding to the other public key.

8. The computer readable medium of claim 1, wherein the operations further comprise:

- receiving a disaster recovery (DR) key pair attested to by the key authority;
- in response to determining that revocation of the key authority is warranted:
  - signing, with a private key of the DR key pair, requests for members of the first and second device groups to discontinue use of the key authorization data structure; and
  - signing, with the private key of the DR key pair, an attestation establishing another key authority for authorizing key exchanges between the first and second device groups.

9. The computer readable medium of claim 1, wherein the operations further comprise:

- exchanging with the second device a symmetric key encrypted using the established shared secret.

10. The computer readable medium of claim 1, wherein the operations further comprise:

- providing, to the second device, a user authentication credential encrypted using the established shared secret.

11. A method, comprising:

receiving, by a first device belonging to a first device group, a request to perform a key exchange to establish a shared secret with a second device belonging to a second device group, wherein the second device group is different from the first device group;

verifying, by the first device, a key authorization data structure issued by a key authority, wherein the key authorization data structure includes a first public key of a first participant authority authorized to identify members of the first device group and a second public key of a second participant authority authorized to identify members of the second device group; and in response to the verifying being successful, performing, by the first device, the requested exchange using a public key pair attested to by the first participant authority as belonging to a member in the first device group.

12. The method of claim 11, further comprising:

generating a participant identity key (PIK) pair associated with an identity of the first device; and sending a request for the first participant authority to issue an attestation identifying the PIK pair as being associated with a member of the first device group.

13. The method of claim 12, wherein the request includes account information for a user account associated with each of the first device group and usable by the first participant authority to determine that the first device is a member of the first device group.

14. The method of claim 12, wherein the generating includes:

deriving the PIK pair using previously stored key material trusted by the first participant authority and usable by the first participant authority to establish that the first device is a member of the first device group.

15. The method of claim 12, wherein performing the requested exchange includes:

generating an ephemeral first participant exchange key (PEK) pair attested to by the PIK pair;

exchanging, with the second device, public keys of the first PEK pair and of a second PEK pair generated by the second device; and deriving the shared secret by performing elliptic-curve Diffie-Hellman (ECDH) using a private key of the first PEK pair and the exchanged public key of the second PEK pair.

16. A first device, comprising:

one or more processors; and memory having program instructions stored therein that are executable by the one or more processors to cause the first device to perform operations including:

receiving a request to perform a key exchange to establish a shared secret with a second device belonging to a second device group, wherein the first device belongs to a first device group, and wherein the second device group is different from the first device group;

verifying a key authorization data structure issued by a key authority, wherein the key authorization data structure includes a first public key of a first participant authority authorized to identify members of the first device group and a second public key of a second participant authority authorized to identify members of the second device group; and in response to the verifying being successful, performing the requested exchange using a public key pair attested to by the first participant authority as belonging to a member in the first device group.

17. The first device of claim 16, wherein the operations further comprise:

receiving a revocation request to revoke the first device's membership in the first device group;

in response to the revocation request:

deleting the public key pair attested to by the first participant authority; and sending, to the first participant authority, a request to remove the first device from the first device group.

18. The first device of claim 16, wherein the operations further comprise:

receiving a revocation request to revoke membership of another device in the first device group;

in response to the revocation request:

sending a request to the first participant authority to replace the first public key of the first participant authority with another public key; and sending a request to the first participant authority to attest to another public key pair using a private key corresponding to the other public key.

19. The first device of claim 16, wherein the operations further comprise:

receiving a disaster recovery (DR) key pair attested to by the key authority;

in response to determining that revocation of the key authority is warranted:

signing, with a private key of the DR key pair, requests for members of the first and second device groups to discontinue use of the key authorization data structure; and signing, with the private key of the DR key pair, an attestation establishing another key authority for authorizing key exchanges between the first and second device groups.

20. The first device of claim 16, wherein the operations further comprise:

exchanging with the second device a symmetric key encrypted using the established shared secret.

* * * * *